(12) United States Patent
Kronkright et al.

(10) Patent No.: US 9,939,041 B2
(45) Date of Patent: Apr. 10, 2018

(54) CONTAINER ASSEMBLY FOR TRANSPORTING A FLEXIBLE PANEL

(71) Applicant: GOKM INNOVATIONS, INC., Santa Fe, NM (US)

(72) Inventors: Dale Kronkright, Santa Fe, NM (US); Robert Chave, Altadena, CA (US); Gregory Bearman, Pasadena, CA (US)

(73) Assignee: The Supporting Organization For the Georgia O'Keeffe Museum, Sante Fe, NM (US)

( * ) Notice: Subject to any disclaimer, the term of this patent is extended or adjusted under 35 U.S.C. 154(b) by 0 days.

(21) Appl. No.: 15/226,067

(22) Filed: Aug. 2, 2016

(65) Prior Publication Data

US 2017/0036851 A1    Feb. 9, 2017

Related U.S. Application Data

(60) Provisional application No. 62/201,057, filed on Aug. 4, 2015, provisional application No. 62/315,221, filed on Mar. 30, 2016.

(51) Int. Cl.
*F16F 15/04* (2006.01)
*F16F 7/01* (2006.01)
(Continued)

(52) U.S. Cl.
CPC .............. *F16F 15/04* (2013.01); *B65D 81/07* (2013.01); *B65D 81/107* (2013.01); *F16F 7/01* (2013.01);
(Continued)

(58) Field of Classification Search
CPC ...... B65D 81/02; B65D 81/07; B65D 81/107; B65D 85/30; F16F 7/01; F16F 7/14;
(Continued)

(56) References Cited

U.S. PATENT DOCUMENTS 3,268,199 A    8/1966   Kordyban et al.
3,655,034 A    4/1972   Stollman et al.
(Continued)

OTHER PUBLICATIONS

Mervin Richard "Art in Transit Handbook for Packing and Transporting Paintings", Nov. 1997.
(Continued)

*Primary Examiner* — Bryon Gehman
(74) *Attorney, Agent, or Firm* — Baker Botts L.L.P.

(57) ABSTRACT

According to certain embodiments, a container assembly for protecting a flexible panel comprises a back panel positioned behind the flexible panel and offset by a first substantially airtight compartment, a front panel positioned in front of the flexible panel and offset by a second substantially airtight compartment, and a stiffener panel positioned in front of the front panel and offset by a third substantially airtight compartment. The front, back, and stiffener panels each comprise one or more rigid materials. Each rigid material has higher natural frequency and lower excursion properties than the flexible panel. The container assembly is tuned using fixed, gas-piston principles to impart the higher natural frequency and lower excursion properties of the rigid materials to the flexible panel such that the natural frequency of the flexible panel increases and the extent to which the flexible panel experiences excursions greater than 350 microns is reduced.

18 Claims, 8 Drawing Sheets

(51) Int. Cl.

| | |
|---|---|
| *F16F 15/02* | (2006.01) |
| *B65D 81/107* | (2006.01) |
| *B65D 81/07* | (2006.01) |
| *F16M 13/02* | (2006.01) |
| *F16F 15/06* | (2006.01) |
| *F16F 7/14* | (2006.01) |
| *B65D 85/30* | (2006.01) |

(52) U.S. Cl.
CPC .............. *F16F 7/14* (2013.01); *F16F 15/022* (2013.01); *F16F 15/06* (2013.01); *F16M 13/02* (2013.01); *B65D 85/30* (2013.01)

(58) Field of Classification Search
CPC .......... F16F 15/02; F16F 15/022; F16F 15/04; F16F 15/06; F16M 13/02
USPC ......... 206/449, 453–455, 521, 522, 583–594
See application file for complete search history.

(56) References Cited

U.S. PATENT DOCUMENTS

| | | | |
|---|---|---|---|
| 3,690,540 A | 9/1972 | Hardigg | |
| 4,015,715 A | 4/1977 | Kelf | |
| 4,856,626 A | 8/1989 | Nakanishi | |
| 4,865,200 A | 9/1989 | Sullivan et al. | |
| 4,877,136 A | 10/1989 | Mizuno et al. | |
| 5,100,096 A * | 3/1992 | Mizuno .................. | B65D 81/07 248/559 |
| 5,314,159 A | 5/1994 | Szarata | |
| 5,518,118 A | 5/1996 | Pütz et al. | |
| 5,595,301 A | 1/1997 | Pütz et al. | |
| 5,640,793 A | 6/1997 | Fischer | |
| 5,819,943 A | 10/1998 | Depuy | |
| 5,924,261 A | 7/1999 | Fricke | |
| 6,263,604 B1 | 7/2001 | Williams | |
| 6,305,545 B1 * | 10/2001 | Morrow ............... | B65D 81/052 206/522 |
| 6,540,080 B2 * | 4/2003 | Moreyra ............... | B65D 81/054 206/586 |
| 6,547,049 B1 | 4/2003 | Tomlinson | |
| 6,648,295 B2 | 11/2003 | Herren et al. | |
| 6,651,948 B2 | 11/2003 | Szarata | |
| 6,802,405 B2 | 10/2004 | Barcock et al. | |
| 6,923,298 B2 | 8/2005 | Tanner | |
| 7,140,508 B2 | 11/2006 | Kuhn et al. | |
| 7,644,820 B2 | 1/2010 | Höhne et al. | |
| 8,172,194 B2 | 5/2012 | Cummins et al. | |
| 8,322,532 B2 * | 12/2012 | Schafer .................. | B65D 25/10 206/454 |
| 2003/0051958 A1 | 3/2003 | Esche | |
| 2007/0012530 A1 | 1/2007 | Garcia | |
| 2007/0119794 A1 | 5/2007 | Hidaka et al. | |
| 2007/0131574 A1 * | 6/2007 | Aoki ................... | B65D 81/052 206/454 |
| 2013/0233760 A1 | 9/2013 | Polando | |

OTHER PUBLICATIONS

"Art in Transit Studies in the Transport of Paintings", "International Conference on the Packing and Transportation of Paintings", Sep. 9-Sep. 11, 1991.
Nobuyuki Kamba, Ph.D., "The Art of Packaging to Protect Cultural Assets", The Art of Innovation—Concept to Reality Summer/Fall 2012, pp. 4-7, 2012.
Rick Yamada, "Wire Rope Isolators: Shock and Vibration Mitigation in the Packing of Museum Artifacts", Paccin, Preparation, Art Handling, Collections Care Information Network, 11 pages, Mar. 31, 2014.

* cited by examiner

US 9,939,041 B2

CONTAINER ASSEMBLY FOR TRANSPORTING A FLEXIBLE PANEL

RELATED APPLICATIONS

This application claims the benefit of U.S. Provisional Application No. 62/201,057, filed Aug. 4, 2015 and entitled "Reusable Component System for Transporting and Storing Fragile Objects," and U.S. Provisional Application No. 62/315,221, filed Mar. 30, 2016 and entitled "Modular System for Transporting Fragile Objects."

TECHNICAL FIELD

Certain embodiments of the present disclosure relate, in general, to transporting and storing fragile objects and, more particularly, to an isolation system for transporting and storing fragile objects.

BACKGROUND

Fragile objects may be at risk of becoming damaged when transported from one location to another. To minimize the risks, fragile objects are traditionally transported in wooden crates. The wooden crates are cushioned with foam intended to protect the fragile object in the event that the wooden crate is dropped.

SUMMARY

Embodiments of the present disclosure may reduce the risk of a fragile object becoming damaged during transit. For example, disclosed herein is a vibration-isolating system comprising a case, one or more environmental buffers, a platform suspended within the case by a plurality of wire rope isolators, a crumple zone beneath the platform and configured with one or more shock-absorbing structures (such as shock-absorbing structures that comprise polycarbonate, polypropylene, and/or expanded polystyrene), and a container assembly configured on the platform. The container assembly is operable to protect a payload. The payload comprises a flexible panel, such as a painting painted on a stretched canvas, a substantially flat membrane, or any other object for which vibration can cause acute or accumulated deterioration. The container assembly comprises a back panel positioned behind the flexible panel and offset by a first substantially airtight compartment, a front panel positioned in front of the flexible panel and offset by a second substantially airtight compartment, and a stiffener panel positioned in front of the front panel and offset by a third substantially airtight compartment.

In certain embodiments, the wire rope isolators are tuned to yield a tuning ratio greater than or equal to 1.4, the tuning ratio determined by dividing a natural frequency of the flexible panel within the container assembly by a natural frequency of the vibration-isolating system. For example, tuning the wire rope isolators comprises selecting at least one of the following characteristics based at least in part on the weight of the container assembly: wire thickness, number of wires in a rope braid, number of loops in the wire rope isolator, loop diameter, loop spacing, number of wire rope isolators, angle of orientation of wire rope isolators relative to the platform, and/or position of the wire rope isolators relative to the platform.

In certain embodiments, the vibration-isolating system further comprises one or more vibration-damping footings. The vibration-damping footings are coupled proximate an outer bottom surface of the case. Each vibration-damping footing comprises a mounting plate, a first cushion and a second cushion coupled to a bottom side of the mounting plate, and a damping system positioned between the first cushion and the second cushion. The damping system comprises a tray containing a quantity of inelastic particulate. Mechanical continuity exists between the one or more vibration-damping footings outside the case and the platform within the case.

In certain embodiments, the container assembly is tuned to reduce the extent to which the flexible panel experiences excursions greater than 350 microns. For example, the front panel, the back, panel, and the stiffener panel each comprise one or more rigid materials, each rigid material having higher natural frequency and lower excursion properties than the less rigid flexible panel, and the container assembly is tuned using fixed, gas-piston principles to impart the higher natural frequency and lower excursion properties of the rigid materials to the flexible panel such that the extent to which the flexible panel experiences excursions greater than 350 microns is reduced. Certain embodiments may eliminate excursions greater than 350 microns.

In certain embodiments, the front panel of the container assembly comprises an acrylic offset from the flexible panel by an air gap having a depth of approximately 3-10 millimeters, and the stiffener panel of the container assembly comprises a paper honeycomb sheet offset from the front panel by an air gap having a depth of approximately 3-5 millimeters.

In certain embodiments, the environmental buffers comprise silica gel tiles and/or thermal phase change tiles positioned within the case, and microclimate control within the back panel of the container assembly. As an example, the microclimate control within the back panel comprises a back board comprising a foam core board having thermal insulation properties and a vapor-proof seal, a humidity control layer comprising a silica gel felt positioned between the flexible panel and the back board, and zeolite clay and/or activated charcoal embedded paper boards operable to absorb volatile organic compounds (VOCs) emitted by the flexible panel.

Also disclosed is a vibration-isolating system comprising a platform suspended in a vertical orientation relative to ground. The platform is suspended by a plurality of wire rope isolators. Each wire rope isolator comprises a wire braid arranged into one or more loops and at least one bracket configured to hold the one or more loops in place. At least one of the wire rope isolators is positioned proximate a top side of the platform and at least one of the wire rope isolators is positioned proximate a bottom side of the platform.

In certain embodiments, the wire rope isolators are tuned to yield a tuning ratio greater than or equal to 1.4, the tuning ratio determined by dividing a natural frequency of an object that the vibration-isolating system protects by a natural frequency of the vibration-isolating system. For example, tuning the wire rope isolators comprises selecting at least one of the following characteristics based at least in part on the weight of the load: wire thickness, number of wires in a rope braid, number of loops in the wire rope isolator, loop diameter, loop spacing, number of wire rope isolators, angle of orientation of wire rope isolators relative to the platform, and/or position of the wire rope isolators relative to the platform.

In certain embodiments, the wire rope isolator(s) positioned proximate the bottom side of the platform are supported by one or more chevron-shaped structures. In certain embodiments, the plurality of wire rope isolators comprises a first pair of wire rope isolators coupled proximate the top side of the platform toward the left, a second pair of wire rope isolators coupled proximate the top side of the platform toward the right, a third pair of wire rope isolators coupled proximate the bottom side of the platform toward the left, and a fourth pair of wire rope isolators coupled proximate the bottom side of the platform toward the right. Each pair of wire rope isolators comprises one wire rope isolator that generally faces toward the front surface of the platform and one wire rope isolator that generally faces toward the back surface of the platform. The system can also include at least one wire rope isolator coupled proximate the right side of the platform toward the middle of the right side and at least one wire rope isolator coupled proximate the left side of the platform toward the middle of the left side.

In certain embodiments, the platform comprises a first shelf portion extending from the front side of the platform and a second shelf portion extending from the back side of the platform, each shelf portion operable to carry a load.

In certain embodiments, wire rope isolator(s) positioned proximate the bottom side of the platform have a different wire thickness, number of wires in a rope braid, number of loops in the wire rope isolator, and/or loop diameter than wire rope isolator(s) positioned proximate the top side of the platform.

In certain embodiments, at least one of the wire rope isolators comprises a first bracket coupled to the platform and a second bracket coupled to a brace operable to mount the platform within a case. Certain embodiments position an impact-responsive, variable stiffness foam structure through a space formed by the loops of said at least one of the wire rope isolators such that the foam structure is an impact attenuation material between the first bracket and the second bracket. The system can further include a vibration-damping footing outside the case. The vibration-damping footing comprises a mounting plate and at least one cushion coupled to the mounting plate. Mechanical continuity exists between the vibration-damping footing and the platform via the brace and the at least one wire rope isolator coupled to the brace.

In certain embodiments, the platform comprises a thermal phase change material encased within one or more aluminum honeycomb panels.

Also disclosed is a vibration-isolating system for protecting an object during transit. The vibration-isolating system comprises a platform and a container assembly configured on the platform. The container assembly comprises a back panel positioned behind the object and offset by a first substantially airtight compartment, a front panel positioned in front of the stretched canvas and offset by a second substantially airtight compartment, and a stiffener panel positioned in front of the front panel and offset by a third substantially airtight compartment. The front panel, the back, panel, and the stiffener panel each comprise one or more rigid materials, each rigid material having higher natural frequency and lower excursion properties than the less rigid object. The container assembly is tuned using fixed, gas-piston principles to impart the higher natural frequency and lower excursion properties of the rigid materials to the object such that the extent to which the object experiences excursions greater than 350 microns is reduced. A plurality of isolators suspend the platform in a vertical orientation relative to ground and are tuned to yield a tuning ratio greater than or equal to 1.4, the tuning ratio determined by dividing a natural frequency of the object that the vibration-isolating system protects by a natural frequency of the vibration-isolating system.

Also disclosed is a vibration-isolating case comprising a case, a first vibration-damping footing located at the bottom side of the case and toward the left, and a second vibration-damping footing located at the bottom side of the case and toward the right. The case is a resilient, plastic-composite walled case. Each vibration-damping footing comprises a mounting plate, first and second cushions, and a damping system. The mounting plate comprises a flat surface and side surfaces extending from the flat surface to form a channel-shaped structure. The mounting plate is coupled to the case such that the flat surface is positioned proximate a bottom outer surface of the case with the channel-shaped structure facing away from the case and extending in the front-to-back direction of the case. The flat surface couples to at least one brace within the case (the at least one brace is positioned proximate a bottom inner surface of the case). The first and second cushions are positioned within the channel-shaped structure such that the first cushion is located toward the front of the case and the second cushion is located toward the back of the case. The side surfaces of the mounting plate protect at least a top portion of each cushion. The damping system comprises a tray positioned between the first cushion and the second cushion. The tray contains a quantity of inelastic particulate. The platform is mounted within the case such that a mechanical path exists between the platform, the at least one brace, and the first and second vibration-damping footing.

Also disclosed is a vibration-damping footing. The vibration-damping footing comprises a mounting plate, a damping system coupled to the mounting plate, and at least one cushion coupled to a bottom side of the mounting plate. In certain embodiments, the mounting plate further comprises side portions adjacent to the cushion and operable to protect the cushion. In certain embodiments, the damping system comprises a tray. The tray can contain a quantity of inelastic particulate, such as lead shot. In certain embodiments, the depth of the tray, the diameter of the inelastic particulate, and/or the amount of inelastic particulate in the tray is selected to optimize damping performance. In certain embodiments, the inelastic particulate is suspended in a gel. Alternatively, the inelastic particulate may be surrounded by air. In certain embodiments, the cushion is an air cushion comprising an air-release hole diameter selected to optimize damping performance.

In certain embodiments, the mounting plate comprises a flat surface and side surfaces extending from the flat surface to form a channel-shaped structure, the at least one cushion comprises a first air cushion and a second air cushion positioned within the channel-shaped structure such that the side surfaces of the mounting plate protect at least a top portion of each air cushion, and the damping system is positioned between the first air cushion and the second air cushion. The damping system comprises a tray containing a quantity of inelastic particulate.

Also disclosed is a vibration-isolating case comprising a case and at least one vibration-damping footing coupled to a bottom side of the case. Examples of the vibration-damping footing were described in the previous paragraphs.

Also disclosed is a container assembly for protecting a flexible panel, such as a stretched canvas or other flexible membrane or panel structure. The container assembly comprises a back panel, a front panel, and a stiffener panel. The back panel is positioned behind the flexible panel and offset by a first substantially airtight compartment. The back panel comprises a back board, a decontamination layer, and a humidity control layer. The decontamination layer and the humidity control layer are positioned between the flexible panel and the back board. The front panel comprises an acrylic material. The front panel is positioned in front of the flexible panel and offset by a first gasket resulting in a second substantially airtight compartment. The second substantially airtight compartment has a depth in the range of 3-10 millimeters. The stiffener panel is positioned in front of the front panel. The stiffener panel is offset by a second gasket resulting in a third substantially airtight compartment. The third substantially airtight compartment has a depth in the range of 3-5 millimeters. A frame surrounds the periphery of the flexible panel. A third gasket seals between the back panel and the frame, a fourth gasket seals between the flexible panel and the frame, and a fifth gasket seals between the front panel and the frame. The front panel, the back, panel, and the stiffener panel each comprise one or more rigid material. Each rigid material has higher natural frequency and lower excursion properties than the flexible panel. The container assembly is tuned using fixed, gas-piston principles to impart the higher natural frequency and lower excursion properties of the rigid materials to the flexible panel such that the natural frequency of the flexible panel increases and the extent to which the flexible panel experiences excursions greater than 350 microns is reduced.

Also disclosed is a container assembly comprising a back panel and a front panel. The container assembly may be configured to protect a substantially flat object. The back panel is positioned behind the object and offset by a first sealed air compartment. The front panel is positioned in front of the object and offset by a second sealed air compartment. In certain embodiments, the second sealed air compartment is dimensioned so as to tune the natural frequency of the object against vibrations. For example, the offset of the second sealed air compartment is dimensioned so that the object and the front panel are in close proximity. In certain embodiments, each of the first and second sealed air compartments is substantially airtight. In certain embodiments, the object comprises a stretched canvas within a frame and the container assembly further comprises a first gasket between the back panel and the frame, a second gasket between the object and the front panel, and a third gasket between the front panel and the frame.

Also disclosed is a container assembly comprising a back panel, a front panel, and a stiffener panel. The container assembly may be configured to protect a substantially flat object. The back panel is positioned behind the object and offset by a first sealed air compartment. The front panel is positioned in front of the object and offset by a second sealed air compartment. The stiffener panel is positioned in front of the front panel and offset by a third sealed air compartment.

In certain embodiments, the offset between the object and the front panel is within the range of approximately 3-10 millimeters and the offset between the front panel and the stiffener panel is within the range of approximately 3-5 millimeters. In certain embodiments, the front panel comprises an acrylic material, the stiffener panel comprises a paper honeycomb sheet, and/or the back panel comprises a foam core board. The back panel can further comprise a decontamination layer and a humidity control layer positioned between the foam core board and the object.

In certain embodiments, the container assembly further comprises a first gasket positioned between the object and the front panel and a second gasket positioned between the front panel and the stiffener panel. The gasket positioned between the front panel and the stiffener panel can have a non-rectangular geometry. The stiffener panel can have a non-uniform thickness such that a volume of a corner portion of the third sealed air compartment is reduced as compared to the volume of a middle portion of the third sealed air compartment.

In certain embodiments, the object has a natural frequency in the range of 1 Hz to 20 Hz and the first sealed air compartment is dimensioned so as to increase the natural frequency of the object by at least 20%, the second sealed air compartment is dimensioned so as to increase the natural frequency of the object by at least 20%, and the third sealed air compartment is dimensioned so as to increase the natural frequency of the object by at least 20%. In certain embodiments, the combination of the first, second, and third sealed air compartments increase the natural frequency of the object to at least 40 Hertz.

In certain embodiments, each of the first, second, and third sealed air compartments are substantially airtight.

Certain embodiments of the present disclosure may provide one or more technical advantages. Certain embodiments may protect a canvas painting, art, or other fragile object from vibration and/or shock that can occur during transit. As an example, certain embodiments may provide a vibration-isolating case that dampens vibrations and/or shock experienced by the object in transit. The case can be configured to isolate damaging frequencies and/or to absorb shock in the event that the case is dropped. As another example, certain embodiments may raise the natural frequency of the object. For example, the object may be arranged within a panel system that raises the natural frequency of the object well above its fundamental damage frequency. Raising the natural frequency may prevent resonance that would otherwise amplify vibrations across the object. Certain embodiments may tune or customize protection based on the particular object being transported, for example, depending on the fundamental damage frequency of the object. Certain embodiments may have all, some, or none of these advantages. Other advantages will be apparent to persons of ordinary skill in the art.

DETAILED DESCRIPTION

Figure 1:
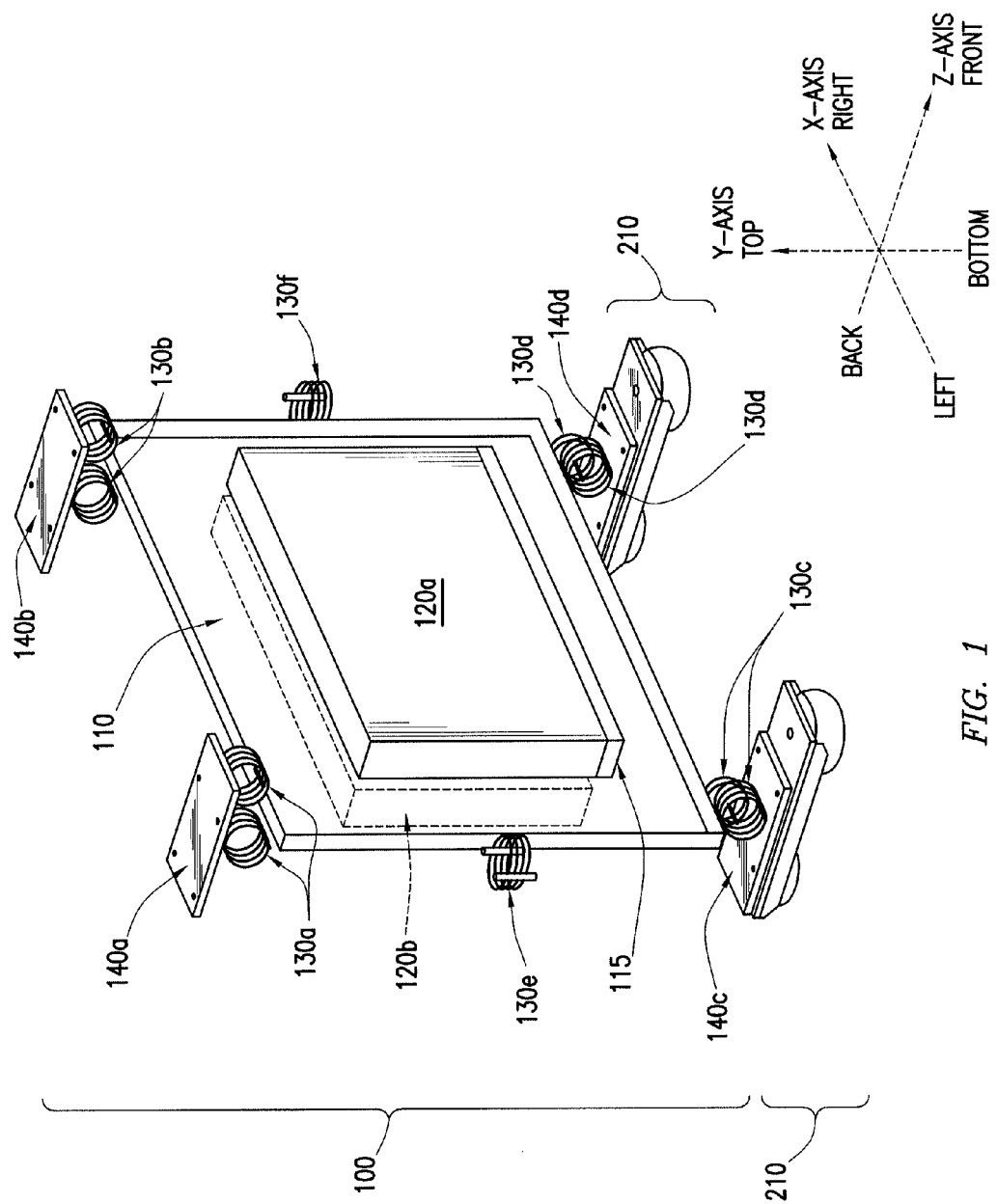
FIG. 1 illustrates an example of a suspension system for transporting and storing a load, in accordance with certain embodiments of the present disclosure.

Fragile objects are traditionally transported in wooden crates cushioned with foam. The foam is intended to protect the fragile object in the event that the wooden crate is dropped. Traditional wooden crates, however, may fail to adequately protect the fragile object from damage. For example, the fragile object may be subjected to significant vibrations when transported by a truck, aircraft, or other vehicle. The vibrations stress the fragile object and may result in cracks or other damage. As an example, the fragile object may be a painting on a canvas. As the paint ages, it tends to become less flexible and more brittle. When vibrations occur, the canvas takes the vibration and the paint restrains the canvas thereby absorbing the kinetic energy of the canvas. If the absorbed energy exceeds stress limits, the paint will crack and separate either at the point of adhesion of the paint to the canvas or between paint layers. Essentially the paint layers start to transform from a continuous film to a series of fragmented sections. Every time a crack forms, that crack becomes the focal point of movement in that area. As more movement occurs, the paint gets more and more damaged at the cracks.

The most damaging vibrations generally occur at frequencies similar to the object's natural frequency. At the object's natural frequency, resonance occurs that amplifies movement. The natural frequency of a painting will generally be in the range of approximately 5-20 Hz and the natural frequency of a glass sculpture or ceramic will generally be in the range of approximately 50-150 Hz. In developing the systems and methods disclosed herein, it was discovered that traditional wooden crates not only fail to reduce damaging vibrations, they actually make the vibrations worse. For example, testing was performed on a traditional wooden crate configured with accelerometers placed inside a painting, inside the foam cushioning, outside the wooden crate, and on the bed of the truck transporting the painting. The testing demonstrated that traditional foam has a relatively low natural frequency (approximately 20-40 Hz) and therefore amplifies vibrations in damaging low frequency ranges. At every point in which foam was added, vibration across the painting increased. That is, the displacement energy experienced by a painting cushioned in foam was worse than if the painting had been placed directly on the bed of the truck. By amplifying the displacement energy, the foam increased the risk of damage to the painting.

The results obtained by testing the foam were unexpected because conventionally foam was thought to be beneficial for protecting fragile objects and because foam behaves differently when observed on its own as compared to when it is observed carrying a load. Both in product literature and in experimental tests on engineering shaker tables and actual road tests, cushioning foams made from open-cell polyurethane (PEU) and extruded, closed-cell polyethylene foams exhibit consistent natural frequencies between 3 Hz-35 Hz, depending upon the configurations used as container cushions and the payload compressions created. These are precisely the frequencies transmitted in all modes of motor, rail and air freight transportation. Because the input force frequencies equal the natural frequencies of the foam cushions, the amplitudes of the vibrations experienced are amplified. Embodiments of the current system seek to resolve this problem by creating components which can predictably raise the natural frequency of the payload without mechanical contact and by tuning the suspension system to affect critical damping of input vibration energies.

Certain embodiments of the present disclosure may provide solutions to this and other problems associated with traditional systems for transporting fragile objects. For example, certain embodiments may reduce exposure to vibration frequencies that would otherwise damage a fragile object in transit, such as vibrations in lower frequency ranges (e.g., vibrations less than approximately 150 Hz, vibrations less than approximately 100 Hz, or other frequencies depending on the natural frequency of the object being transported). Certain embodiments use a suspension system to provide tunable protection from vibration and shock. The suspension system includes a platform to carry the object. The platform connects to isolators that suspend the platform. The isolators may be tunable to dampen vibrations occurring at the natural frequency and/or raise the natural frequency of the load to a frequency sufficiently above the fundamental damage frequency of the object.

In certain embodiments, the suspension system may be packed inside a vibration-isolating case. The vibration-isolating case may include a sturdy case and vibration-damping footing. The vibration-damping footing may be tuned to dampen certain damaging frequencies, such as low-frequency, large displacement frequencies, for example, frequencies less than approximately 5 Hz. In addition, if the fragile object is substantially flat, the fragile object may be packaged using a panel system, for example, prior to being loaded onto the platform of the suspension system and/or being packed inside the vibration-isolating case. The panel system provides protection during transit by controlling motion across the fragile object. In general, the panel system places the substantially flat object, such as a painting, between panels on the front and back sides of the object. Substantially airtight air gaps between the flat object and the panels increase stiffness that reduces vibration movement across the flat object. Additional panels may be used to increase stiffness.

For a more complete understanding of the present invention and the advantages thereof, reference is now made to the following description and the accompanying drawings, wherein like numerals are used for like and corresponding parts of the various drawings.

FIG. 1 illustrates an example of a suspension system 100 for transporting and storing a load, in accordance with certain embodiments of the present disclosure.

Suspension system 100 may include a platform 110 configured to carry a load 120. For purposes of explanation, FIG. 1 illustrates the orientation of suspension system 100 relative to an x-axis extending in the direction of platform 110's length (e.g., from left to right), a y-axis extending in the direction of platform 110's height (e.g., from top to bottom), and a z-axis extending in the direction of platform 110's width (e.g., from front to back). In the example illustrated in FIG. 1, platform 110 provides a flat surface to support load 120 in an x-y plane. Platform 110 optionally includes a shelf 115, such as a flange that projects outward in the x-z plane to further support load 120. Platform 110 may comprise any suitable material, such as metal, plastic, wood, cardboard, etc. In certain preferred embodiments, platform 110 comprises rigid material having a high natural frequency, for example, platform 110 comprises one or more light-weight aluminum honeycomb panels.

Load 120 includes an object 300, such as a painting, drawing, sculpture, artifact, museum specimen, or other fragile object. In some embodiments, the load may further include packaging. For example, object 300 may be packaged within a container assembly, such as the panel system described with respect to FIGS. 7-8 below. The panel system (or object 300 itself in embodiments that do not use a panel system) can optionally be enclosed within a box or other protective covering, such as a weatherproof (or rain proof) cover comprising stretch wrap, polyfilm, KEVLAR®, life raft material, vinyl, thermal blanket, and/or other suitable material. Load 120 may be secured to platform 110 using one or more latches and/or other securing mechanisms. In certain embodiments, platform 110 may carry more than one load. As an example, multiple loads 120 could be carried on the same surface of platform 110 (not shown). As another example, FIG. 1 illustrates a first load 120a on a first surface of platform 110 and a second load 120b on the opposite surface of platform 110. To carry loads on opposite surfaces, platform 110 may include a first shelf portion extending from the front side of the platform and a second shelf portion extending from the back side of the platform. The first and second shelf portions can be separate shelves, or they can be a single shelf that wraps around platform 110 or is bisected by platform 110.

Suspension system 100 further includes isolators 130 configured to suspend platform 110. In general, isolators 130 reduce movement of platform 110 carrying load 120. As an example, isolators 130 may reduce vibrations that can occur when transporting platform 110 by truck, aircraft, or other vehicle. As another example, if suspension system 100 is dropped, isolators 130 may dampen the impact on platform 110. Any suitable isolators may be used. Examples of isolators 130 include wire rope isolators, rubber air bladders, inflatables, smartfoam, or other structures operable to suspend platform 110. Examples of wire rope isolators are further described with respect to FIGS. 4A-4B below. Various embodiments may comprise one type of isolator 130 (e.g., wire rope isolators only) or multiple types of isolators (e.g., wire rope isolators and smartfoam isolators).

Isolators 130 may be placed in any suitable location, such as at the top of platform 110, at the bottom of platform 110, and/or at the sides of platform 110. FIG. 1 illustrates an example that includes six points of isolation in the following general locations: top-left (isolators 130a), top-right (isolators 130b), bottom-left (isolators 130c), bottom-right (isolators 130d), left-middle (isolator 130e), and right middle (isolator 130f). Each point of isolation may include one or more isolators 130. In the embodiment shown in FIG. 1, isolators 130a, 130b, 130c, and 130d comprise two isolators each, wherein each pair of isolators 130 comprises one isolator that generally faces toward the front surface of platform 110 and one isolator that generally faces toward the back surface of platform 110, and isolators 130e and 130f comprise one isolator each for a total of ten isolators. As illustrated in FIG. 1, isolators 130 are configured such that platform 110 is oriented in a substantially vertical direction relative to the ground.

In certain embodiments, suspension system 100 includes one or more braces 140 to facilitate mounting platform 110 within a container, such as a vibration-isolating case 200 described with respect to FIGS. 2-3 below. Brace(s) 140 may have any suitable configuration. As an example, FIG. 1 illustrates four braces 140, and each brace 140 comprises a rigid plate configured to couple one or more isolators 130 to an inner wall of the container. In the example, brace 140a couples to isolators 130a (top left), brace 140b couples to isolators 130b (top right), brace 140c couples to isolators 130c (bottom left), and brace 140d couples to isolators 130d (bottom right). As another example, in an alternative embodiment, brace 140 may comprise a frame within the container, as shown in FIG. 3. Although FIG. 1 illustrates a certain arrangement of load 120, isolators 130, and braces 140, other embodiments may use any suitable number and arrangement of these components.

In certain embodiments, suspension system 100 may be configured within a vibration-isolating case. FIG. 2 illustrates an example of a vibration-isolating case 200, in accordance with certain embodiments of the present disclosure. Vibration-isolating case 200 comprises case 205 and vibration-damping footing 210. Case 205 may be any case suitable to contain suspension system 100. Case 205 may be a commercial case manufactured by PELICAN™, STORM CASE™, FAWIC™, or some other manufacturer. Alternatively, case 205 may be a custom case manufactured specifically for vibration isolation. Case 205 may be made of metal, plastic, rubber, and/or other suitable material. The design of case 205 may provide protection from the elements (e.g., moisture, heat, dust, etc.). In certain preferred embodiments, case 205 is a resilient, plastic-composite walled case that is weather-proof, water-proof, acoustically-sealed, resilient (e.g., able to retain its shape after an impact), shock-absorbing, and puncture-resistant, such as a polypropylene honeycomb sandwich panel-walled FAWIC™ case with aluminum extrusion corners and seams or a roto-molded polyethylene PELICAN™ case.

Case 205 may comprise front, back, left, right, top, and bottom sides. The bottom side of case 205 may be positioned to take the gravitational load during transit, and the top side of case 205 may be positioned opposite the bottom side. For purposes of explanation, the front and back sides of case 205 may extend along the length of the object being transported, as depicted by the x-axis in FIG. 1, and the left and right sides may extend along the width of the object being transported, as depicted by the z-axis in FIG. 1.

Case 205 may comprise one or more doors 202 for accessing the interior of case 205. A door 202 may comprise any suitable mechanism for opening and closing the case, and may be positioned in any suitable location. As an example, a door 202 could be built into one of the sides of case 205, or a side of case 205 could itself operate as a door 202 (e.g., a hinge could attach one side of case 205 to another side of case 205). In certain embodiments, door 202 may allow a portion of case 205 to be detached and reattached to case 205. As an example, a top portion and bottom portion of case 205 could be latched together when case 205 is closed and unlatched/separated when case 205 is open.

Case 205 may further comprise environmental buffers 204. Examples of environmental buffers 204 include thermal buffers (such as insulation layers or thermal phase change tiles) and humidity buffers (such as silica gel tiles). Certain environmental buffers may be implemented using one or more tiles positioned within case 205. In certain embodiments, the tiles snap onto an interior surface of case 205, such as the interior of door 202. In addition, or in the alternative, certain embodiments position environmental buffers within case 205 by placing one or more environmental buffers on or within platform 110. As an example, thermal phase change material may be encased within platform 110. Encasing the thermal phase change material within platform 110 may protect the tiles from damage, shock, and leakage and may ensure that the tiles are sufficiently close to load 120 to buffer the temperature surrounding load 120.

An example of encasing thermal phase change material within platform 110 includes placing one or more thermal phase change tiles between a first panel (e.g., a front-facing panel) and a second panel (e.g., a back-facing panel) of platform 110. In other words, platform 110 may comprise thermal phase change material sandwiched between the first panel and the second panel. In certain embodiments, the first and second panels may comprise aluminum honeycomb panels that encase thermal phase change tiles within an epoxy adhesive matrix.

In certain embodiments, each thermal phase change tile measures approximately 5½×5½×1 inches (14×14×2.5 centimeters) and weighs approximately 300 grams (10.4 ounces). Within the temperature range of 15 to 30 degrees Celsius, each tile contains 50 British Thermal Units (BTU) of reserve thermal mass. Assuming a rate of 200 BTU reserve per 1.5 cubic meter of enclosed space in order to add or subtract 15 degrees Fahrenheit, and an average enclosed space of 1.5 cubic meters for a medium sized case 205, four tiles could be embedded within voids created between the front- and back-facing panels of platform 110. Thermal phase change material may be obtained from Cryopak™ or other manufacturers.

Vibration-damping footing 210 may be coupled to the bottom side of case 205. One or more vibration-damping footings 210 may be utilized to suspend case 205 from directly contacting a floor below. Vibration-damping footing 210 may be coupled to any suitable section of the bottom side of case 205. As an example, FIG. 2 illustrates two vibration-damping footings 210 coupled to the bottom side of case 205. Vibration-damping footing 210 may be coupled to case 205 through brace 140 such that mechanical continuity exists from vibration-damping footing 210 to platform 110. Mechanical continuity may optimize the damping performance of the vibration-isolating case 200. Vibration-damping footing 210 may be tuned to dampen certain damaging frequencies, such as frequencies less than 5 Hz. In this way, vibration-damping footing 210 may be operable to reduce these frequencies from transmitting vibrations to load 120 within case 205. In one embodiment, the amount and type of vibration-damping footings 210 are selected based on the contents of case 205. Vibration-damping footing 210 is further described with respect to FIGS. 5-6 below.

Figure 2:
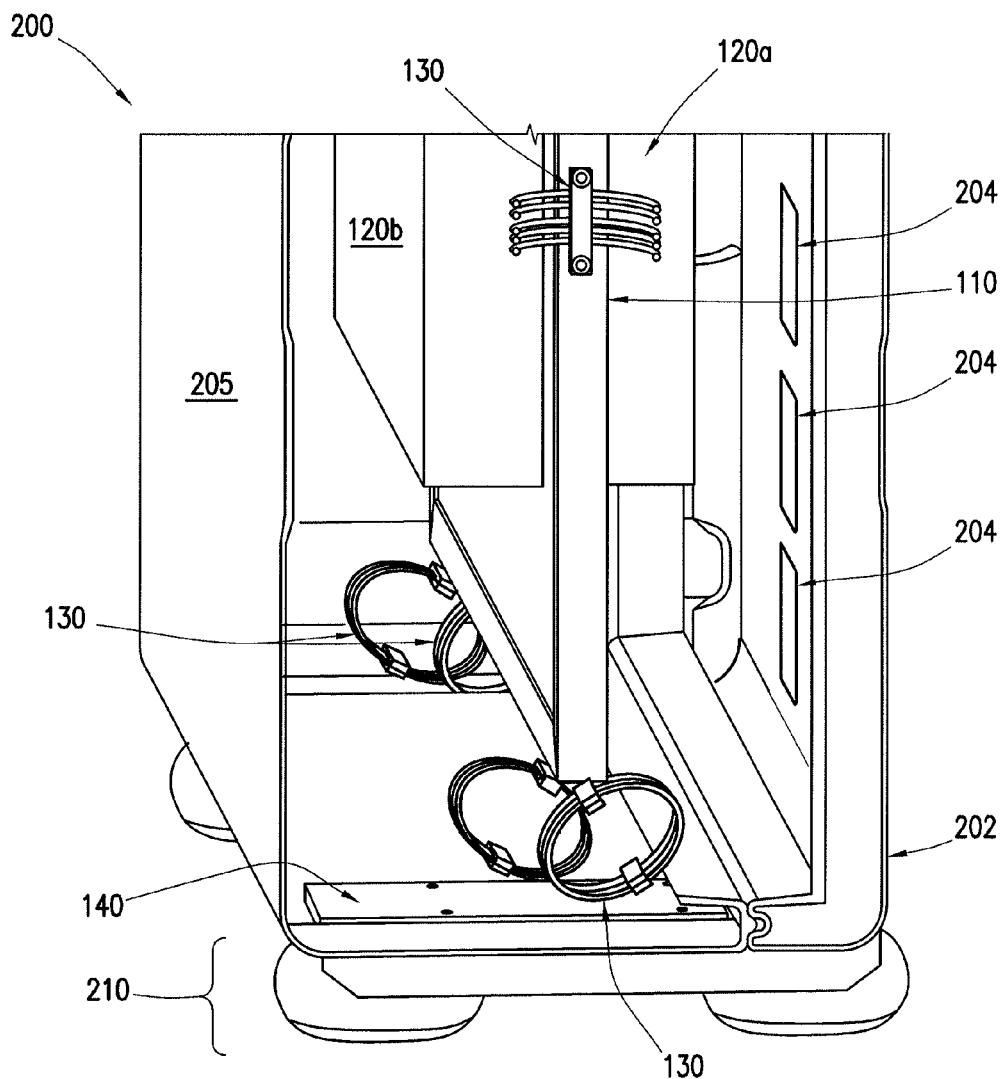
FIG. 2 illustrates an example of a vibration-isolating case, in accordance with certain embodiments of the present disclosure.
Figure 3:
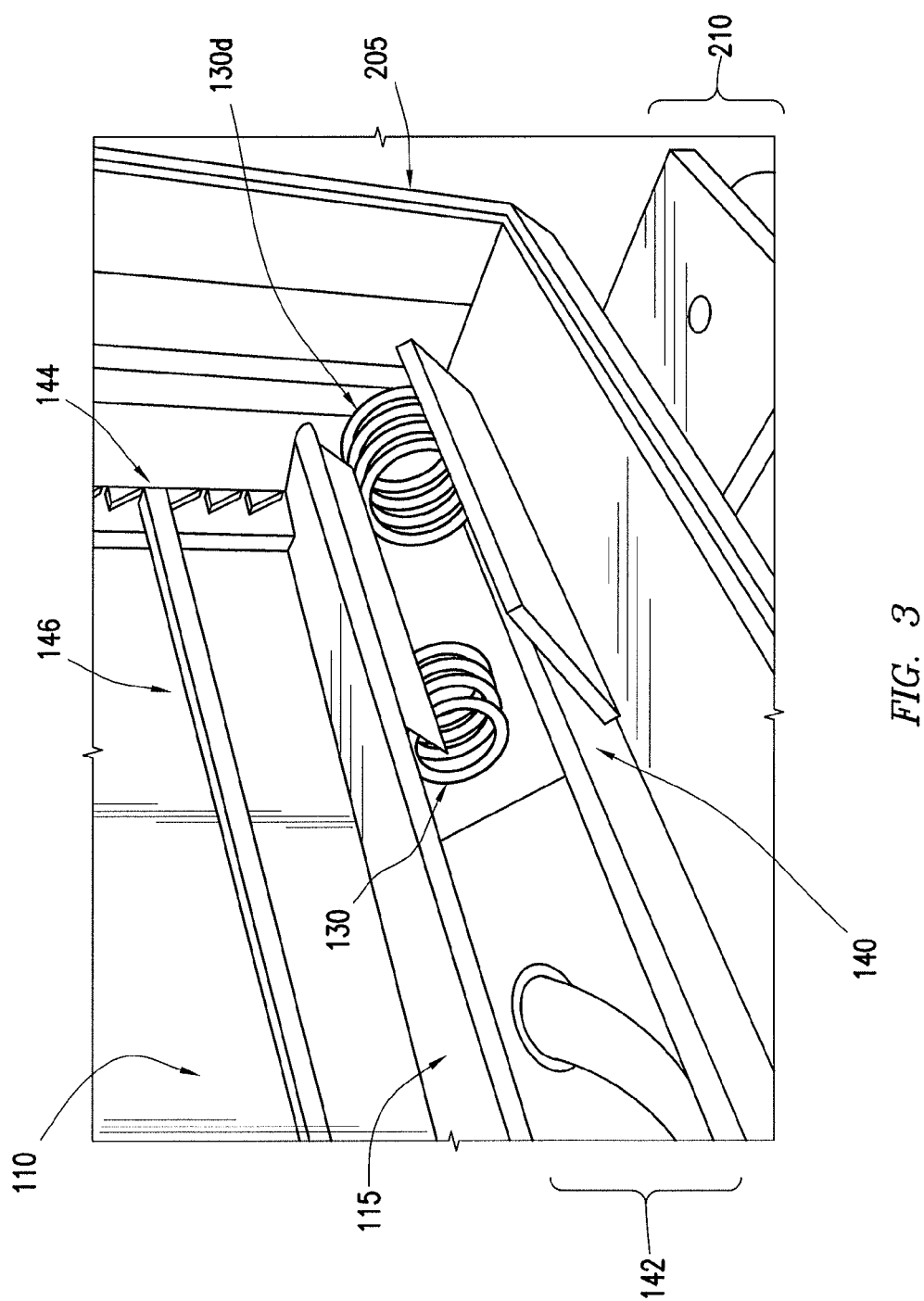
FIG. 3 illustrates another example of vibration-isolating case, in accordance with certain embodiments of the present disclosure.

FIG. 2 further illustrates that platform 110 couples to a plurality of wire rope isolators 130. FIG. 2 includes four wire rope isolators 130 toward the bottom interior region of case 205 that are illustrated as positioned at an angle. To hold wire rope isolators 130 at an angle, one or more support structures may be used. For example, FIG. 3 below illustrates an example of a chevron-shaped support structure that can also be used in the embodiment illustrated in FIG. 2. For purposes of illustration, such support structure(s) are not expressly shown in FIG. 2 in order to improve the visibility of other components in the figure.

FIG. 3 illustrates another example of vibration-isolating case 200, in accordance with certain embodiments of the present disclosure. FIG. 3 includes platform 110, shelf 115, isolators 130, brace 140, case 205, and vibration-damping footing 210 similar to those described above with respect to FIGS. 1-2. The embodiment of brace 140 illustrated in FIG. 3 provides an example alternative to the embodiment of brace 140 illustrated in FIGS. 1-2. In FIGS. 1-2, brace 140 comprises individual rigid plates that mount to case 205. By contrast, FIG. 3 illustrates brace 140 as a continuous frame that extends around a perimeter within case 205. Brace 140 optionally includes one or more rigid plates coupled between the frame portion and isolators 130. For example, FIG. 3 illustrates an example in which two rigid plates connect to the frame portion at an angle to form a chevron shaped support structure for isolators 130. The chevron structure may allow isolators 130 facing opposite sides of platform 110 to stabilize platform 110. Thus, platform 110 may generally float between isolators 130 configured within the chevron structure, which can reduce the extent to which movement of case 205 impacts load 120. Optionally, similar chevron shaped support structures could be used to support top isolators (e.g., 130*a*, 130*b*), bottom isolators (e.g., 130*c*, 130*d*), and/or side isolators (e.g., 130*e*, 130*f*). In certain embodiments, the chevron shaped support structure is used only for bottom isolators (e.g., 130*c*, 130*d*) to provide additional support in the load-bearing direction. In certain embodiments, the chevron shaped support structure is not used at all.

FIG. 3 further illustrates a crumple zone 142. FIG. 3 illustrates crumple zone 142 as generally located below platform 110. However, crumple zone 142 may refer to any area within case 205 likely to experience a relatively high amount of shock, for example, in the event that case 205 is dropped. Suppose case 205 drops one or two meters. The resulting impact may be on the order of 300 G at all frequencies. Crumple zone 142 can be configured with one or more shock absorbing structures to absorb much of the impact and prevent damage to the object in transit.

In certain embodiments, the shock absorbing structures may compress quickly in the event of a shock (such as a drop) and expand slowly after the shock to reduce rebound movement of platform 110. In addition, or in the alternative, crumple zone 142 may include shock absorbing structures that compress quickly in the event of a shock (such as a drop) but do not decompress. Using a material that does not decompress may avoid rebound movement. If the structure in crumple zone 142 remains compressed, it can be used as an indicator to identify whether case 205 was handled improperly. This information can be used in making an insurance claim for mishandling in transit. Examples of shock absorbing structures include replaceable honeycomb, fluted, and/or corrugated shaped structures composed of paper, polypropylene, polycarbonate, polystyrene (e.g., closed cell expanded polystyrene (XPS) core), and/or any suitable combination of the preceding. The selection of shape(s) and material(s) of the shock absorbing structures depends upon the weight of the payload and the shock impulse to be absorbed. In certain embodiments, an inexpensive paper honeycomb material may be used as a first, easily replaced shock-absorbing structure, and the paper honeycomb material may be underlaid with a more expensive but greater-energy absorbing plastic honeycomb or polystyrene structure and smart foam to absorb shock from a catastrophic impact. In certain embodiments, shock absorbing structures of crumple zone 142 may be placed within isolators 130. For example, as further described below with respect to FIG. 4, wire rope isolators can include a plurality of loops 132. Shock absorbing structures may optionally be placed within loops 132 to protect isolators 130 in the event of a shock.

FIG. 3 also illustrates an example of a latch channel 144 and latch 146. Latch channel 144 provides a point of connection for latch 146 to connect to platform 110. Latch 146 extends across load 120 to help secure load 120 onto platform 110. Any suitable latch may be used, such as a metal bar or a fabric strap. In certain embodiments, a metal bar (such as an aluminum bar) may be preferable to a fabric strap because a fabric strap may tend to amplify vibrations in damaging frequency ranges.

Figure 4A:
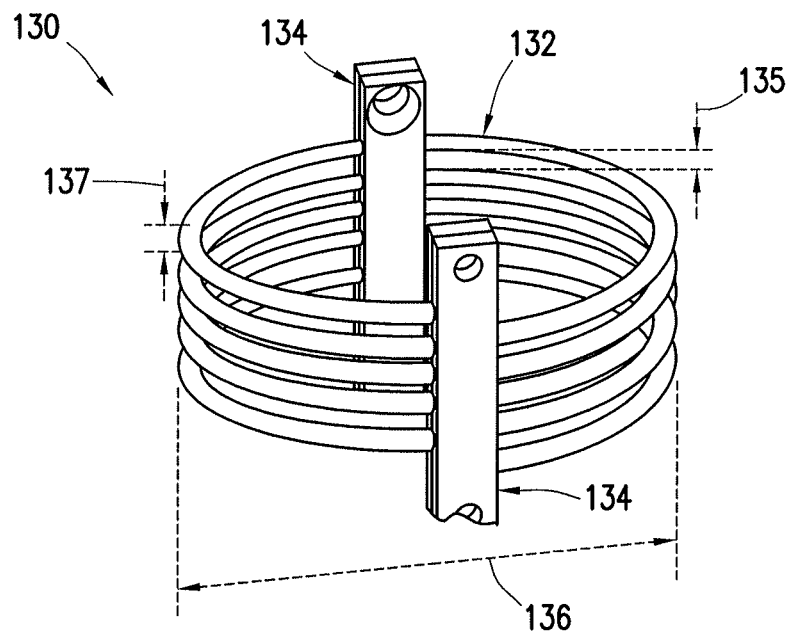
FIGS. 4A-4B illustrate examples of wire rope isolators for a suspension system, in accordance with certain embodiments of the present disclosure.
Figure 4B:
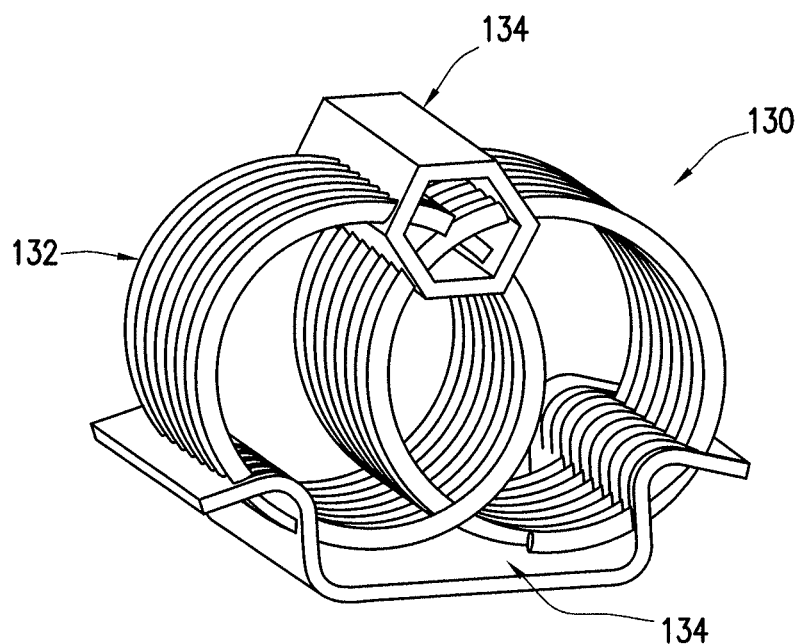

FIGS. 4A-4B illustrate examples of wire rope isolators 130 for suspension system 100, in accordance with certain embodiments of the present disclosure. Each wire rope isolator 130 may comprise a coil-like structure having a plurality of loops 132 held together by one or more brackets 134. As an example, each wire rope isolator 130 may include a first bracket 134 operable to attach to platform 110 and a second bracket 134 operable to attach to brace 140 of suspension system 100. Wire rope isolator 130 may further comprise a loop spacing 135 (e.g., due to spreading that creates space between loops 132), a loop diameter 136, and a wire thickness 137 (e.g., the diameter of the wire used to form loops 132). Each wire rope isolator 130 may act as a non-linear spring (i.e., the resistance of the wire rope isolator 130 increases as the force upon it increases).

In certain embodiments, suspension system 100 may be made self-centering. For example, wire rope isolators 130 (such as those illustrated in FIG. 4A and/or FIG. 4B) can be configured to minimize the extent to which platform 110 carrying load 120 moves from its initial position in response to vibration and/or shock. The initial position can be referred to as point (0, 0, 0) relative to the x-axis, y-axis, and z-axis. Return of platform 110 to the initial position (0, 0, 0) after an excursion relative to the exterior shell can be optimized by arranging wire rope isolators 130 to oppose one another. For example, assume that a first wire rope isolator ("WRI-1") opposes a second wire rope isolator ("WRI-2"). A movement that pushes WRI-1 would pull the opposing WRI-2 such that when WRI-1 undergoes compression, the opposing WRI-2 undergoes tension, and vice versa. Thus, opposing wire rope isolators 130 keep the net effect of the movement as close to neutral as possible.

In the example illustrated in FIG. 1, returning platform 110 to its initial point relative to the y-axis is accomplished at least in part by configuring wire rope isolator(s) 130a at the top of platform 110 in opposition to wire rope isolator(s) 130c at the bottom of platform 110 and by configuring wire rope isolator(s) 130b at the top of platform 110 in opposition to wire rope isolator(s) 130d at the bottom of platform. The opposing wire rope isolator(s) 130 may be aligned in the direction of the y-axis. For example, left-top wire rope isolators 130a may be aligned directly above left-bottom wire rope isolators 130c on the opposite side of platform 110, and right-top wire rope isolators 130b may be aligned directly above right-bottom wire rope isolators 130d on the opposite side of platform 110. In addition, the wire rope isolators 130 may be aligned with vibration-damping footing 210 in the direction of the y-axis. For example, wire rope isolators 130c may be aligned directly above the left vibration damping-footing 210 and wire rope isolators 130d may be aligned directly above the right vibration-damping footing 210. Alignment in the direction of the y-axis increases the damping effect of suspension system 100.

Returning platform 110 to its initial point relative to the x-axis can be accomplished at least in part by configuring wire rope isolator(s) 130e at the left of platform 110 in opposition to wire rope isolator(s) 130f at the right of platform 110. In addition, the pairs of wire rope isolators 130 at the top and/or bottom of platform 110 can be wound to reduce movement in the direction of the x-axis. As an example, a pair of wire rope isolators 130c may be configured at the bottom-left of platform 110. The first wire rope isolator 130c(1) and the second wire rope isolator 130c(2) can be angled toward each other to create some degree of opposition in the x-direction. For example, wire rope isolators 130c(1) and 130c(2) may be closer together at the points where they contact platform 110 and may splay outward so that they are further apart at the points where they contact brace 140. Similarly, the other pairs of wire rope isolators (e.g., pair 130a, pair 130b, and pair 130d) can each be wound to reduce movement in the direction of the x-axis. In certain embodiments, wire rope isolators 130 in a pair may be configured at a 120 degree angle relative to one another.

Returning platform 110 to its initial point relative to the z-axis is accomplished at least in part by configuring wire rope isolators 130 facing the front of platform 110 in opposition to wire rope isolators 130 facing the back of platform 110. As discussed above, wire rope isolators 130 may be configured in pairs, such as the pair of isolators 130c(1) and 130c(2). Isolator 130c(1) can face the front of platform 110, and isolator 130c(2) can face the back of platform 110.

Suspension system 100 may be configured such that each wire rope isolator 130 is in a state of slight compression when platform 110 is in its initial position (0, 0, 0). Thus, suspension system 100 can respond to movements that cause one wire rope isolator 130 to undergo increased compression without immediately causing the opposing wire rope isolator 130 to undergo tension such that the net movement of platform 110 is gradual and kept to a minimum.

Wire rope isolators can be tuned to accommodate both the load 120 and the natural frequency of the load 120, thus achieving critical damping of transportation-induced vibrations. Tuning can include selecting loop spacing 135, loop diameter 136, wire thickness 137, number of wires in a rope braid, number of loops, number of isolators 130, angle of orientation of isolators 130 relative to platform 110, position of isolators 130 relative to platform 110, and so on. As an example, as the weight of load 120 increases, wire thickness 137 can be increased, loop diameter 136 can be decreased, and/or the number of loops can be increased. In certain embodiments, wire rope isolators 130 are tuned to yield a tuning ratio greater than or equal to 1.4. The tuning ratio is determined by dividing a natural frequency of an object that the vibration-isolating system protects by a natural frequency of the vibration-isolating system. In certain embodiments, wire rope isolators 130 can be tuned to isolate one or more frequencies in the range of approximately 8-50 Hz, depending on the object that the vibration-isolation system protects.

In certain embodiments, wire rope isolators 130 may be tuned separately depending on their position within suspension system 100. Wire rope isolators 130 positioned proximate the bottom side of platform 110 (the gravitational load-bearing side of platform 110) tend to experience heavier loading and may therefore be tuned to support more weight than wire rope isolators 130 positioned proximate the top side, right side, and/or left side of platform 110. Thus, rope isolators 130 positioned proximate the bottom side of platform 110 can be tuned to support more weight. As an example, wire rope isolator(s) 130 positioned proximate the bottom side of platform 110 can have a different wire thickness, number of wires in a rope braid, number of loops in the wire rope isolator, and/or loop diameter than wire rope isolator(s) 130 positioned proximate the top side of platform 110. As another example, wire rope isolators 130a and 130b at the top of platform 110 can be tuned to provide more flexibility and wire rope isolators 130c and 130d may be tuned to provide more rigidity. This may allow platform 110 to provide an inverted-pendulum movement such that the gravitational load-bearing side at the bottom of platform 110 stays relatively steady relative to the top of platform 110.

In certain embodiments, a foam structure can be positioned through a space formed by loops 132 of wire rope isolator 130 (e.g., the foam structure can be placed through the space at the core of wire rope isolator 130). The foam structure is operable to act as a safety stop to provide impact attenuation and prevent wire rope isolator 130 from crimping or creasing in the event of a drop or similar impact. For example, FIGS. 4A-4B each illustrate embodiments in which wire rope isolator 130 includes two brackets 134. The foam structure can be positioned between the first bracket 134 and the second bracket 134 to prevent the first bracket 134 from coming into contact with the second bracket 134 in the event of a drop or similar impact. The foam structure may be made of material that is soft and cushy in low-impulse environments (e.g., impulses due to vibrations) and that stiffens in high-impulse environments (e.g., impulse due to dropping case 205). For example, the foam structure may comprise an impact-responsive, variable stiffness foam such as smartfoam, urethane foam (for example PoronXRD urethane), or other material that can compress rapidly and form chemical crosslinks that stiffen and absorb energy in high-impulse environments. The foam structure may have any suitable shape, such as a block shape, a cylindrical shape, or, more generally, a mass of foam. In certain embodiments, the width/diameter of the foam structure is approximately half of loop diameter 136. This may allow some air space for wire rope isolator 130 to flex in low-impulse environments without engaging the foam structure. In certain embodiments, each wire rope isolator (e.g., isolators 130a-130f of suspension system 100) can be configured with a foam structure as a safety stop.

Figure 5:
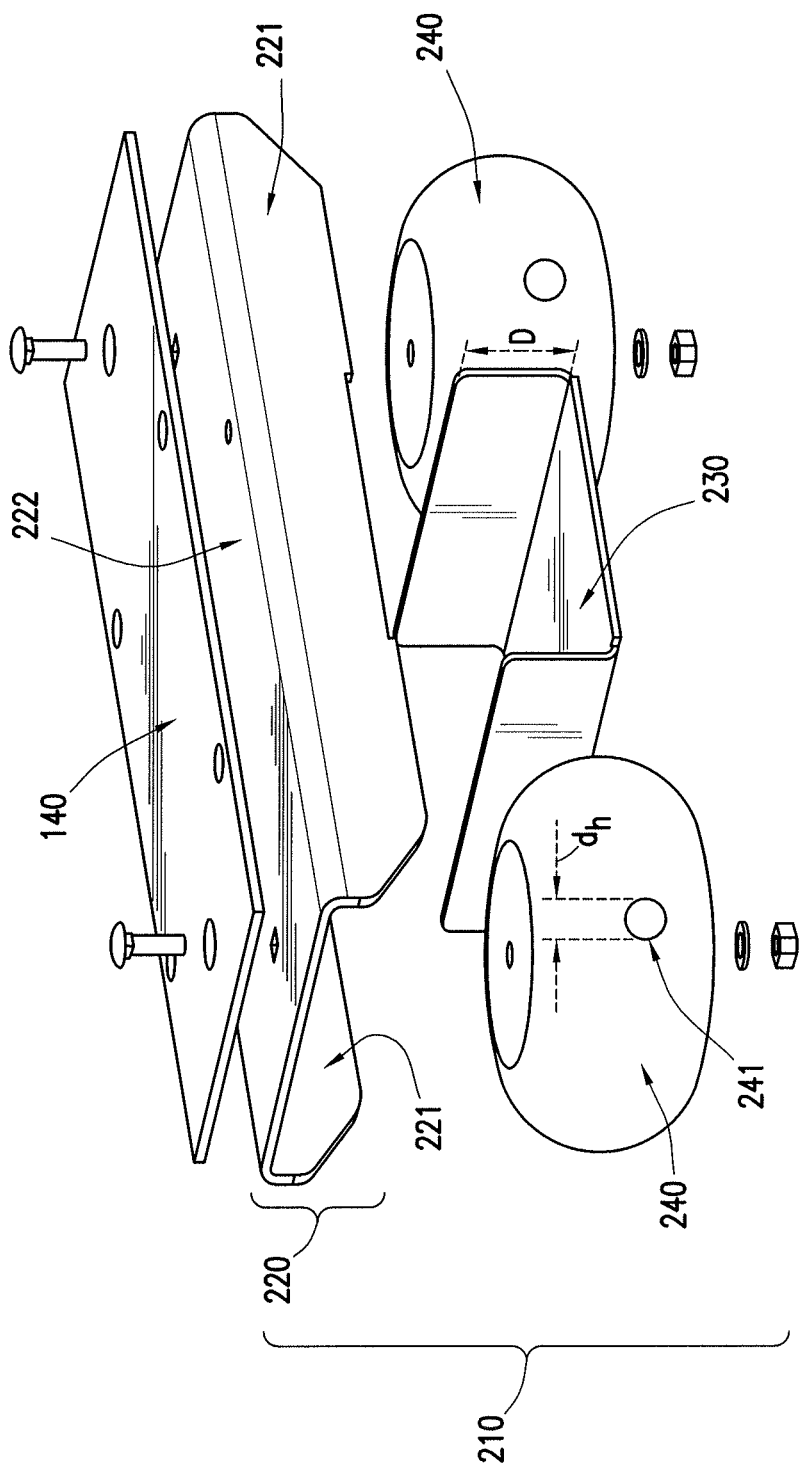
FIG. 5 illustrates an example of a vibration-damping footing, in accordance with certain embodiments of the present disclosure.

FIG. 5 illustrates an example of a vibration-damping footing 210, in accordance with certain embodiments of the present disclosure. Vibration-damping footing 210 comprises a mounting plate 220, a damping system 230, and at least one cushion 240. In the example illustrated in FIG. 5, damping system 230 and cushion 240 are coupled directly to mounting plate 220. In alternate embodiments, damping system 230 and cushion 240 may couple to one or more other components which couple to the mounting plate 220.

Mounting plate 220 may be made from aluminum or other metal, plastic, or any other suitable material. Mounting plate 220 may be custom or may be a universal design suitable for a variety of different applications. The dimensions and material of mounting plate 220 may be selected based on the size of case 205, the load 120, and/or other suitable factors. Mounting plate 220 may comprise one or more side portions 221 and/or flat surface 222. Flat surface 222 may comprise a top side (which may be configured to face case 205) and a bottom side (which may be configured to face cushion 240). In the example illustrated in FIG. 5, mounting plate 220 comprises two side portions 221 extending away from flat surface 222 such that mounting plate 220 has a channel-shaped structure.

To configure vibration-isolating case 200 with vibration-damping footing 210, case 205 may be coupled directly or indirectly to vibration-damping footing 210. An example of directly coupling case 205 comprises fastening mounting plate 220 to case 205 itself (e.g., using a bolt or screw). An example of indirectly coupling case 205 comprises fastening mounting plate 220 outside case 205 to a brace 140 inside case 205 (e.g., using a bolt or screw that extends through a hole in case 205). For example, flat surface 222 may be positioned proximate a bottom outer surface of case 205 with the channel-shaped structure facing away from case 205, and flat surface 222 couples to at least one brace 140 within case 205 (i.e., at least one brace positioned proximate a bottom inner surface of case 205). Thus, mechanical continuity may be provided from vibration-damping footing 210 to suspension system 100 via braces 140. Mounting plate 220 may be oriented relative to case 205 such that it extends in the front-to-back direction.

In the example shown in FIG. 5, side portions 221 of mounting plate 220 protect cushion 240 from damage. For example, movers may cause vibration-isolating case 200 to slide laterally across the floor in the process of moving it. Such movement can cause a shearing force to be applied to cushion 240. Side portion 221 may be operable to abut one or more sides of cushion 240 and reduce damage from such shearing force. Side portion 221 may provide further protection for cushion 240 from puncture or other damage. In certain embodiments, side portion 221 of mounting plate 220 extends such that it abuts or covers a top portion of cushion 240 and allows a bottom portion of cushion 240 to protrude, for example, to allow room for cushion 240 to compress and expand in response to an impact.

Damping system 230 may be any system suitable to dampen vibrations transmitting through the vibration-damping footing 210. In certain embodiments, damping system 230 may also lower the center of gravity of vibration-isolating case 200. Lowering the center of gravity may improve stability of vibration-isolating case 200 and reduce movement of load 120 within. In one embodiment, damping system 230 comprises a solid weight. In an alternate embodiment, damping system 230 comprises a damping material and a tray operable to contain the damping material. In the example illustrated in FIG. 5, damping system 230 comprises a U-shaped tray having a depth D and operable to contain a damping material. In the example, the tray is mounted to the bottom side of the flat surface 222, and the damping material is contained by side portions 221. In an alternate embodiment, damping system 230 comprises a box operable to contain a damping material. The size, composition, mass, and other aspects of damping system 230 may be selected to optimize the damping performance of the vibration-damping footing 210. An embodiment of damping system 230 is further described with respect to FIG. 6 below.

Cushion 240 may be any cushion suitable to suspend the mounting plate 220 and the damping system 230 above a floor below. Cushion 240 may be a commercial product such as a Pelican SKID-MATE™. Alternatively, cushion 240 may be a custom product manufactured based on the size of case 205, the load 120, or other suitable factors. The size, thickness, composition material, and other aspects of cushion 240 may be selected to optimize the damping performance of the vibration-damping footing 210. In the example illustrated in FIG. 5, cushion 240 is a donut-shaped polyethylene bladder with an air-release hole 241 of diameter $d_h$. In the example, cushion 240 may compress rapidly under a large shock by releasing air through air release hole 241. The diameter $d_h$ of air release hole 241 may be selected to restrict the speed that air may reenter the polyethylene bladder to optimize the damping performance of the vibration-damping footing 210. Thus, in the example, cushion 240 acts like a non-linear spring such that cushion 240 allows air to go out in response to an impact thereby causing air cushion 240 to compress and after the impact allows air to go in more slowly than it went out thereby causing air cushion 240 to decompress slowly and avoid jostling load 120.

In the example illustrated in FIG. 5, two cushions 240 are coupled to the bottom side of flat surface 222 of the mounting plate 220. With reference to FIGS. 1-2, vibration-isolating case 200 can be configured with the first air cushion 240 and second air cushion 240 positioned within the channel-shaped structure formed by mounting plate 220 such that the first cushion 240 is located toward the front of case 205 and the second cushion 240 is located toward the back of case 205. FIGS. 1-2 also illustrate an example having two vibration-damping footings 210: a first vibration-damping footing 210 (e.g., located at the bottom side of case 205 and toward the left) and a second vibration-damping footing 210 (e.g., located at the bottom side of case 205 and toward the right).

Figure 6:
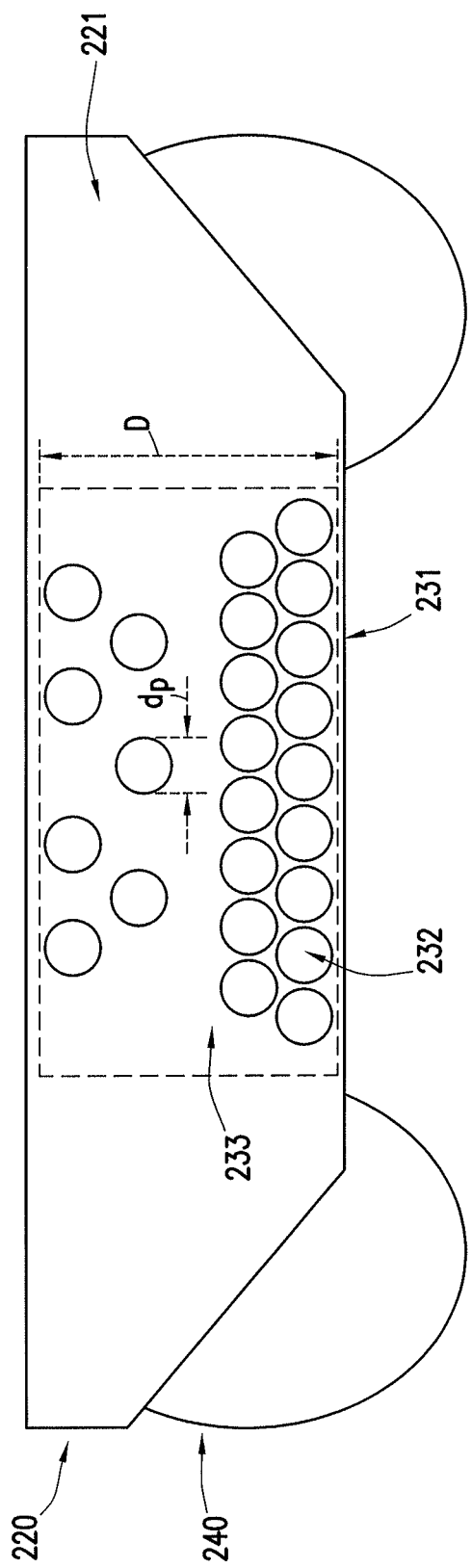
FIG. 6 illustrates an example of a vibration-damping footing, in accordance with certain embodiments of the present disclosure.

FIG. 6 illustrates an example of a vibration-damping footing 210, in accordance with certain embodiments of the present disclosure. In FIG. 6, part of side portion 221 is invisible to reveal damping system 230 positioned between a first air cushion 240 and a second air cushion 240 of vibration-damping footing 210. Damping system 230 comprises a tray 231 operable to contain a quantity of inelastic particulates 232 and a tray filler 233. Tray 231 may be made from metal, plastic, or any other suitable material. Tray 231 may be custom or may be a universal design suitable for a variety of different applications. In the example illustrated in FIG. 6, tray 231 is U-shaped and has a depth D selected to optimize the damping performance of the vibration-damping footing 210.

Tray 231 contains a quantity of inelastic particulates 232. Inelastic particulates 232 may refer to any particulates that dissipate, rather than conserve, kinetic energy in response to a collision. For example, inelastic particulates 232 may vibrate against one another to dissipate energy through inelastic collisions. Inelastic particulate 232 may comprise lead shot or any other particulate suitable to dampen the vibrations of vibration-damping footing 210. In one embodiment, the depth of the tray and the amount of inelastic particulate 232 (e.g., lead shot) is configured to dampen frequencies less than 10 Hz. For example, the damping effects of inelastic particulates 232 may be configured to dampen vibrations less than approximately 5 Hz, such as frequencies between 2 and 5 Hz.

FIG. 6 illustrates an example of the vibration damping characteristics of inelastic particulates 232. In the example, vibration-damping footing 210 experiences a vertical vibration in the positive y-axis direction, and inelastic particulates 232 absorb a portion of the resulting kinetic energy. This energy absorption may cause some inelastic particulates 232 to become airborne. In the example, vibration-damping footing 210 experiences a second vertical vibration in the negative y-axis direction and the airborne inelastic particulates 232 absorb a portion of the resulting kinetic energy when they collide with mounting plate 220. In this example, the inelastic particulates 232 may be operable to dampen vibrations which result from positive and negative movement in the y-axis.

The ability to dampen vibrations from positive and negative movement in the y-axis may be useful when transporting an object by truck, for example. Typically, the truck bed continually goes up and down as it hits potholes or bumps in the road. The up and down motion can be significant. Some of that is cushioned by the row of tires, however, the truck's suspension system causes the tires to come back up very quickly after hitting a bump in the road. Inelastic particulates 232 can help absorb kinetic energy when the truck tires come back up. When the truck tires go down, inelastic particulates 232 sitting at the bottom of tray 231 lift and absorb some of that vertical energy. When the truck tires come back up, some of the inelastic particulates 232 that were lifted will be falling and, when the inelastic particulates 232 hit the bottom of tray 231, will absorb some of the kinetic energy from the rebound motion of the truck.

In certain embodiments, the depth D of tray 231 may be selected to control the frequency of collisions between the inelastic particulates 232 and the mounting plate 220 in order to optimize the damping performance of the vibration-damping footing 210. In certain embodiments, the quantity of inelastic particulates 232 and the diameter $d_p$ of each inelastic particulate 232 may be selected to optimize the damping performance of the vibration-damping footing 210. As an example, in certain embodiments, the depth D of tray 231 may be in the range of approximately 0.5 to 3 inches, the quantity of inelastic particulates 232 may be suspended in air or in a aqueous gel medium and may fill approximately 20-50% of the compartment formed by tray 231, and/or the inelastic particulates 232 may comprise lead shot particulates having a mean diameter $d_p$ size in the range of approximately 1 to 5 millimeters and include a mixture of sizes.

Tray filler 233 may comprise a liquid, gas, gel, or other material. In one embodiment, tray filler 233 comprises air from the atmosphere. In an alternate embodiment, tray filler 233 comprises a gel selected specifically to optimize the damping performance of the vibration-damping footing 210. Tray filler 233 may be operable to restrict the movement of inelastic particulate 232 as they move inside tray 231. The quantity, density, pressure, and other characteristics of tray filler 233 may be selected to optimize the damping performance of the vibration-damping footing 210.

Figure 7:
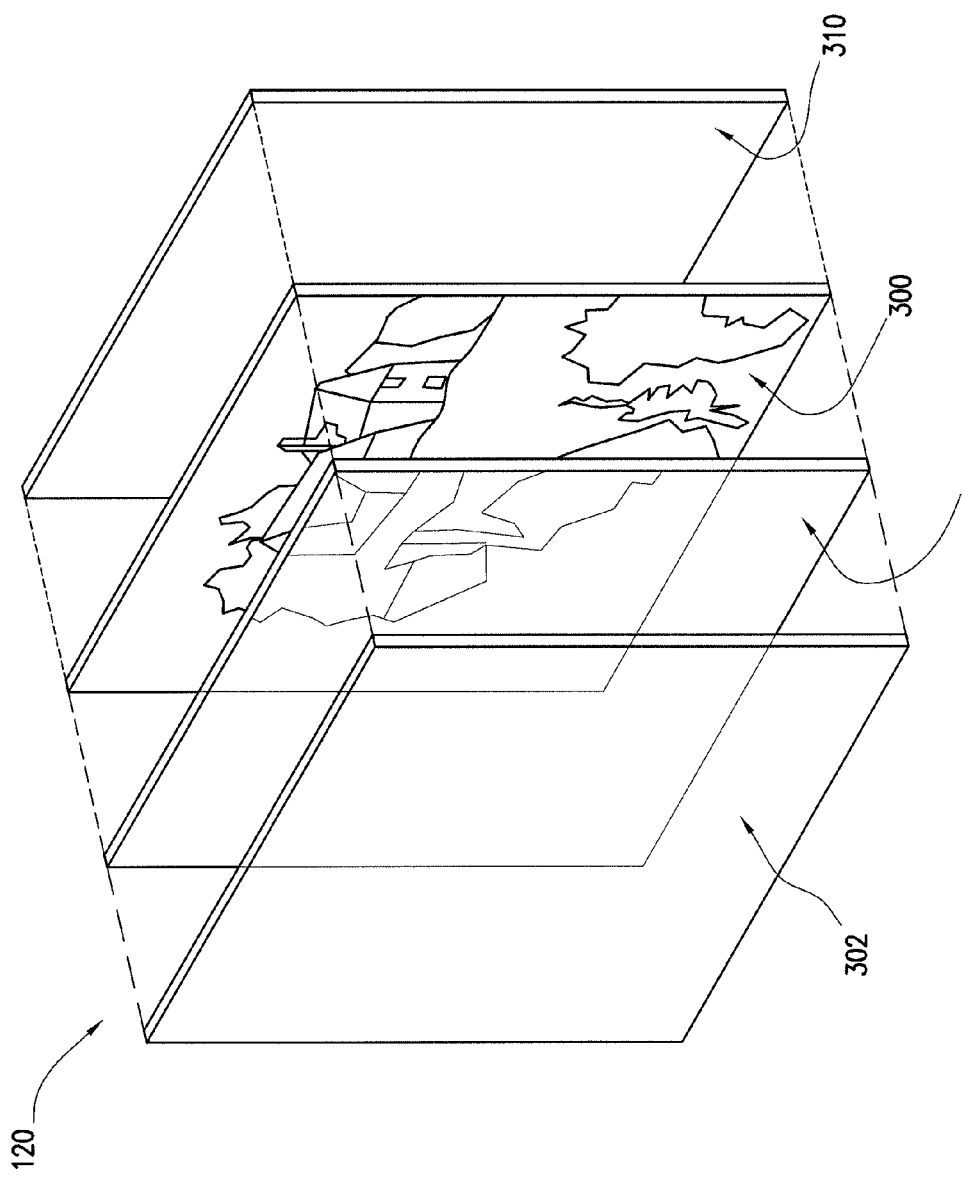
FIG. 7 illustrates an example container assembly for a load, in accordance with certain embodiments of the present disclosure.

FIG. 7 illustrates an example container assembly for a load 120, in accordance with certain embodiments of the present disclosure. In general, FIG. 7 illustrates load 120 arranged using a panel system that places a substantially flat object 300, such as a painting, between panels on the front and back sides of the object. Substantially airtight air gaps (i.e., sealed air compartments) between object 300 and the panels increase stiffness and reduce vibration movement across object 300. In the example illustrated in FIG. 7, a three panel system comprises, in order, a back panel 310, object 300, front panel 301, and stiffener panel 302. Back panel 310 is positioned behind object 300 and offset by a first sealed air compartment, front panel 301 is positioned in front of object 300 and offset by a second sealed air compartment, and stiffener panel 302 is positioned in front of front panel 301 and offset by a third sealed air compartment. In an alternate embodiment, load 120 may be a two panel system, comprised of, in order, back panel 310, object 300, and front panel 301, without stiffener panel 302.

Using panels that are relatively more stiff than object 300 and that are offset by sealed air compartments may control vibrations across object 300. For example, in the embodiment illustrated in FIG. 7, back panel 310 imparts its rigidity onto object 300, stiffener panel 302 imparts its rigidity onto front panel 301, and front panel 301 further imparts its rigidity onto object 300. This result is based on principles of the Universal Gas Law applied to flat planes within a control volume system. The gas trapped in any sealed air compartment acts to resist motion of one panel due to the resistance in motion of the other panel and resulting compression of the trapped gas. The effect is to quiet the motion of a flexible panel with a more rigid panel and ultimately to reduce the load on the object during transit and handling. The size of the offset between the planes can be tuned in order to minimize the motion of the flexible panel while maintaining enough of an offset to prevent the planes from colliding during any remaining vibration. For example, in the ideal case of two perfectly flat planes, the stiffness of a 0.125 inch air gap is exceedingly high. For a displacement of 0.001 inches the restoring force between the two planes is approximately 17 pounds per square foot, assuming sea level air pressures, room temperature, and normal levels of humidity. For small gaps, the mechanical stiffness between two planes is higher than casual observation would seem to indicate.

In certain embodiments, the panel system may be tuned to raise the natural frequency of object 300. As an example, assume the natural frequency of the canvas is 7 Hz. Back panel 310 can be configured to double the natural frequency of the canvas (from 7 Hz to 14 Hz in the example). Front panel 301 can be configured to increase the natural frequency of the canvas-and-back panel configuration by about one-third (from 14 Hz to 21 Hz in the example). Stiffener panel 302 can be configured to double the natural frequency of the canvas-back panel-and-front panel configuration (from 21 Hz to 42 Hz in the example). Other embodiments may tune the natural frequency to any suitable value. As an example, for an object 300 having a natural frequency in the range of 1 Hz to 20 Hz, the first sealed air compartment could be dimensioned so as to increase the natural frequency of object 300 by at least 20%, the second sealed air compartment could be dimensioned so as to increase the natural frequency of object 300 by at least 20%, and the third sealed air compartment could be dimensioned so as to increase the natural frequency of object 300 by at least 20%. Additionally, the combination of the first, second, and third sealed air compartments could be configured to increase the natural frequency of the object to at least 40 Hz. In certain embodiments, the panel system can prevent high displacement excursions, such as excursions greater than 350 microns. This may prevent movement or sagging that can occur when a stretched canvas is tipped, knocked over, or placed in a horizontal orientation.

The use of small-volume, static gas piston principals to impart the high natural frequency and low excursion properties of the rigid panels to the less rigid object 300 may allow for limiting undesirable excursions and raising the natural frequency of object 300 without direct mechanical contact between object 300 and the other panels. For example, in embodiments where object 300 comprises a painting, air pistons prevent front panel 301, stiffener panel 302, and back panel 310 from directly touching the face of the canvas.

Figure 8:
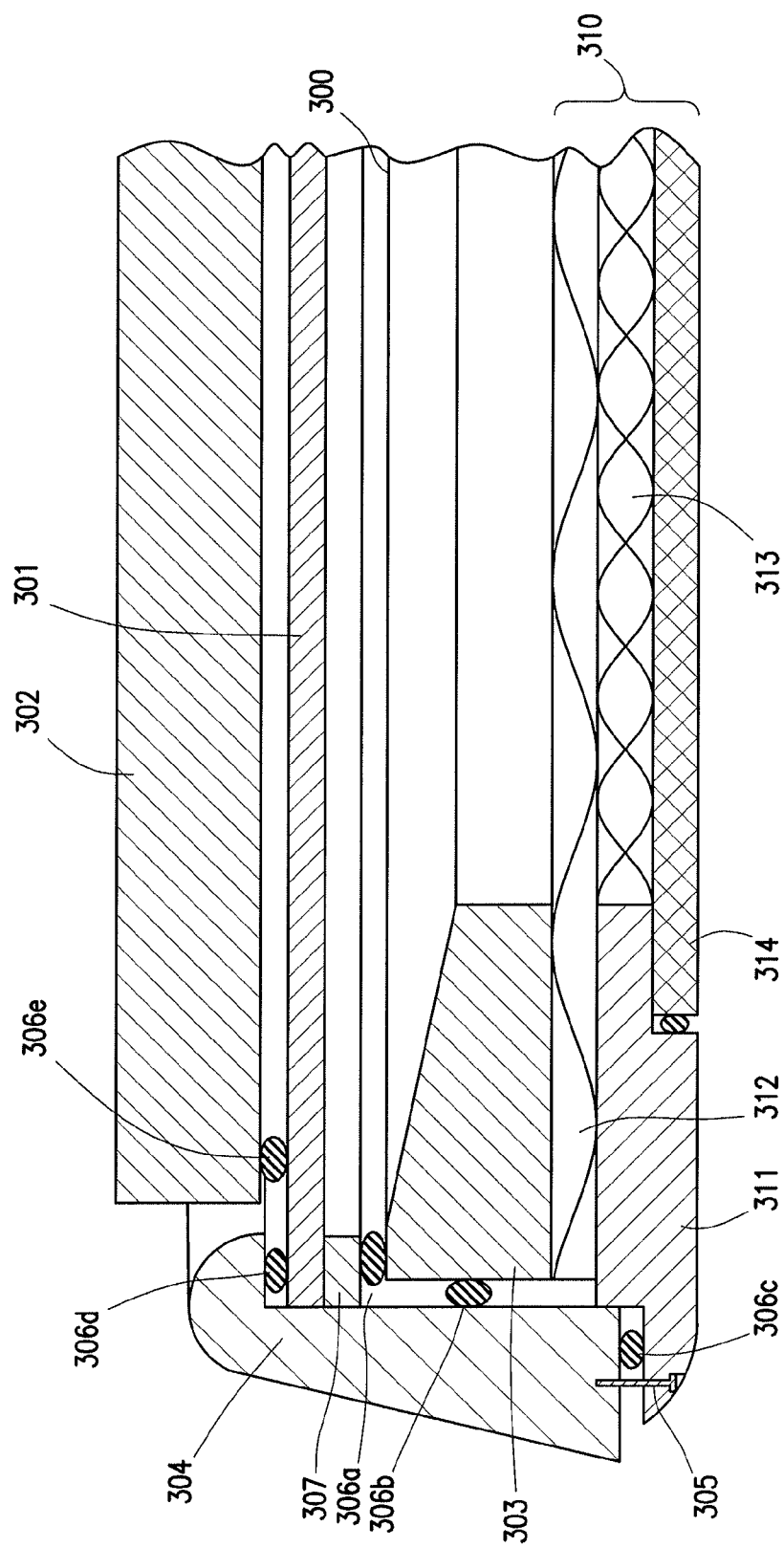
FIG. 8 illustrates an example container assembly for a load, in accordance with certain embodiments of the present disclosure.

FIG. 8 illustrates an example container assembly for a load 120, in accordance with certain embodiments of the present disclosure. FIG. 8 illustrates load 120 as including an object 300 configured within a panel system. Object 300 may be a painting, canvas, or other thin-membrane artifact susceptible to vibration. Object 300 may be mounted on stretcher 303. Stretcher 303 may provide a support structure, such as a wooden frame, and the edges of object 300 (e.g., the canvas) wrap around the sides of stretcher 303. In certain embodiments, object 300 may be affixed to stretcher 303 using nails. Stretcher 303 may also incorporate cross members for added rigidity. Object 300 (stretched on stretcher 303) may be mounted in a frame 304, such as a gallery frame or other art frame. Frame 304 may include a recessed edge or rabbet within which object 300 may be mounted.

As further described below, load 120 includes a plurality of gaskets 306 to seal components of load 120 in place. Any suitable gaskets 306 may be used, such as closed cell polyethylene gaskets. In certain embodiments, a gasket 306 may form an air gap between components sealed by the gasket 306. As an example, a gasket 306 may be used to form an air gap between two panels. As another example, a gasket 306 (gasket 306b) may be used to seal and/or form an air gap between object 300 and frame 304. In certain embodiments, gaskets 306 may be selected to provide an air gap with a depth in the range of 3-5 millimeters. Load 120 may be pressure fit to compress the various gaskets.

FIG. 8 illustrates an embodiment in which the panel system includes a front panel 301, an optional stiffener panel 302, and back panel 310. In certain embodiments, front panel 301 comprises a transparent glazing such as acrylic or glass that is relatively more stiff than object 300. In certain embodiments, the front panel has a thickness in the range of approximately 3-5 millimeters. Gasket 306a creates a sealed air compartment between object 300 and front panel 301. In certain embodiments, gasket 306a is a 3-5 millimeter closed cell polyethylene gasket positioned between object 300 and front panel 301. A spacer 307 may be used to increase the depth of the air gap between object 300 and front panel 301. The spacer 307 in combination with gasket 306a keep the front panel in close proximity to the face of the object to increase stiffness, but sufficiently offset to ensure there are not collisions between front panel 301 and object 300 during transit and handling. As an example, spacer 307 may comprise a polycarbonate material and may have a height in the range of approximately 1-5 millimeters, such as 3 millimeters. Thus, in certain embodiments, gasket 306a together with spacer 307 form an air gap between the surface of object 300 and front panel 301 having a depth in the range of approximately 4-10 millimeters, such as 6-8 millimeters. Front panel 301 may be sealed within the rabbet portion of frame 304 by another gasket (gasket 306d).

Stiffener panel 302 is an optional panel that can be used to provide additional rigidity to load 120. Stiffener panel 302 comprises any suitable material, such as paper honeycomb board or an aluminum honeycomb panel. To impart more stiffness to object 300, stiffener panel 302 may be more rigid than front panel 301 (which as discussed above may be an acrylic glazing in certain embodiments). Stiffener panel 302 seals to front panel 301 using gasket 306e. In certain embodiments, the gas gap between stiffener panel 302 and front panel 301 is smaller in depth than the gas gap between front panel 301 and object 300. Making the stiffener panel 302-to-front panel 301 gas gap smaller that the front panel 301-to-object 300 gas gap makes the stiffener panel 302-to-front panel 301 gas gap significantly more rigid in compression. Thus, stiffener panel 302 meaningfully reduces the vibration of the entire system by reducing deflection under load of front panel 301, thereby relieving the strain on object 300. In certain embodiments, gasket 306e comprises a 3-5 millimeter closed cell polyethylene gasket operable to produce a substantially airtight seal between stiffener panel 302 and front panel 301. In certain embodiments, stiffener panel 302 is held in place by a clamp, tape, straps, or a box surrounding the complete assembly of load 120.

Back panel 310 may be coupled to the reverse side of stretcher 303 and may form a continuous seal along the reverse side of stretcher 303. For example, back panel 310 may comprise a backing frame 311 that couples to frame 304 via gasket 306c, wherein gasket 306c is operable to provide a substantially airtight seal. In certain embodiments, gasket 306c is a 3-5 millimeter closed cell polyethylene gasket. One or more fasteners 305 may be used to secure backing frame 311 to frame 304. Examples of fasteners 305 include a screw, nail, bolt, adhesive, etc. Note that gasket 306c provides a gap between frame 304 and the backing frame 311 portion of back panel 310. The gap between back panel 310 and object 300 may be relatively large, for example approximately three-quarters of an inch, depending on the depth of stretcher 303 and/or the thickness of back panel 310.

In certain embodiments, back panel 310 further comprises a decontamination layer 312, a humidity control layer 313, and a back board 314. Decontamination layer 312 may be positioned behind stretcher 303 and may be operable to scavenge volatile organic compounds (VOCs), such as acid or aldehyde, or other contaminants emitted by object 300. As an example, a paper board comprising clay and/or activated charcoal (e.g., zeolite clay and activated charcoal embedded paper boards) may be used in decontamination layer 312.

Humidity control layer 313 may be operable to stabilize humidity. In certain embodiments, humidity control layer 313 comprises a polypropylene felt containing a silica gel. The silica gel is conditioned to maintain acceptable humidity within frame 304. A dust cover may be positioned between humidity control layer 313 and object 300 to prevent silica dust from getting on object 300.

Back board 314 provides stiffness to back panel 310 such that back panel is relatively more stiff than object 300. Back board 314 may comprise a substantially rigid foam board. In certain embodiments, back board 314 comprises a foam core polystyrene board or other material which may provide thermal insulation to prevent rapid temperature fluctuations. In certain embodiments, back board 314 may further comprise an aluminum layer (e.g., a layer on or within the foam board) operable to stabilize humidity. As an example, back board may comprise a commercial product such as MARVELSEAL®, an aluminized polyethylene film for vapor proofing and humidity control.

Thus, back panel 310 may provide microclimate control by configuring one or more environmental buffers (e.g., humidity control layer 313 and/or back board 314) to provide humidity and/or thermal protection. Microclimate control may refer to environmental buffers within back panel 310 or within the sealed compartment formed between back panel 310 and object 300. Certain embodiments may also provide macroclimate control by configuring additional environmental buffers within case 205. Examples of environmental buffers for macroclimate control include thermal phase change tiles and/or silica gel tiles that can attach to an interior-facing wall or door of case 205 and/or can attach on or within platform 110.

An alternative embodiment of load 120 reduces the corner volume on stiffener panel 302, which increases stiffness still further, by reducing the amount of compressible gas in the third sealed air compartment without increasing the likelihood of a collision between front panel 301 and stiffener panel 301 during heavy shock loading of the whole system, such as might occur if load 120 was dropped. That is, reducing the corner volume of stiffener panel 302 in turn reduces the corner volume of the third sealed air compartment between stiffener panel 302 and front panel 301, resulting in a lower volume of compressible gas in the third sealed air compartment that enhances the stiffening effect imparted on front panel 301 from stiffener panel 302. This enhanced stiffening occurs where the volume of trapped air is reduced while still maintaining the same surface area on the face of front panel 301. This may be achieved through methods such as producing a concave geometry on the surface of stiffener panel 302 that extends into the third sealed air compartment to occupy space and/or producing a stiffener panel 302 having a non-uniform thickness. This geometry may be possible through using additive techniques such as three-dimensional printing. This may further be achieved by using a non-rectangular geometry for gasket 306e, such as an oval shape, that would eliminate the corners where the displacement of a vibrating panel would be minimal.

Although FIG. 8 illustrates one example arrangement of gaskets 306, other embodiments may use different arrangements of gaskets 306. As an example, with larger air gaps between backing panel 310 and object 300 or between front panel 301 and stiffener panel 302 on a relatively large canvas (e.g., 2 meter×4 meter) the gas piston space may be broken into several smaller gas piston spaces by using gasketing to divide one large space into several smaller spaces, thus adding the rigidity of a smaller panel.

The various components described with respect to FIGS. 1-8 may be combined to form a vibration isolation system. The vibration isolation system may use any suitable combination of components, such as isolators 130, vibration-damping footing 210, panels (e.g., front panel 301, back panel 310, and optionally stiffener panel 302), and/or other components. Examples of other components include one or more sensors that may optionally be mounted in or on case 205, load 120, and/or object 300. Sensors may monitor and record vibrations and shocks occurring during transit, pressurization conditions, environmental conditions, GPS coordinates, surveillance cameras, and/or other suitable information. Additional examples of other components include humidity buffers, thermal controls (e.g., insulation materials, heating and cooling units, etc.), or other components selected to maintain optimal environmental conditions within case 205.

The combination of components may be selected and tuned based on the object that the vibration isolation system protects. As an example, a system for protecting a stretched canvas or similar object may include vibration-damping footing 210 tuned to protect the canvas from frequencies in the range of approximately 0-10 Hz, a panel system tuned to increase the natural frequency of the canvas to at least 40 Hz, and isolators 130 tuned to yield a tuning ratio greater than or equal to 1.4.

The tuning ratio is determined by dividing a natural frequency of object 300 that the vibration-isolating system protects by a natural frequency of the vibration-isolating system (such as suspension system 100). For an isolation system to work, the natural frequency of the thing to be isolated (e.g., object 300 within load 120) must be higher than the natural frequency of the isolation system. Over most of the spectrum, the number at which amplification starts to change to isolation is a ratio of 1.4, which is the square root of 2 approximated to the nearest one-tenth. If the natural frequency of the thing to be isolated divided by the natural frequency of the isolation system is less than 1.4, then amplification will occur. Thus, the tuning ratio for achieving true, critical damping over most of the spectrum may be expressed according to the following formula:

$$(F_P \div F_I) \geq 1.4$$

In the formula, the tuning ratio is expressed as $(F_P \div F_I)$, where $F_P$ refers to the natural frequency of the payload being protected by the vibration-isolating system (e.g., object 300), and $F_I$ refers to the natural frequency of the vibration-isolating system. As an example, applying the formula to a scenario in which the natural frequency of the payload being protected (Fp) equals 14 Hz, the natural frequency of the vibration-isolating system $(F_I)$ would be less than or equal to 10 Hz in order to yield a tuning ratio greater than or equal to 1.4.

As an example, a vibration isolation system may be tuned to protect a painting on a canvas. A canvas tends to have the lowest natural frequency and is the most flexible as compared to other art media, such as glass, marble, or ceramic sculptures and artifacts. Thus, the vibration-isolating system can be built to be able to isolate the lowest frequencies (the frequencies associated with canvases) and can then be tuned according to the natural frequency of the object being isolated (e.g., canvas, glass, marble, or ceramic, and so on).

For purposes of the example, assume the natural frequency of the canvas is 7 Hz. To achieve a tuning ratio greater than 1.4 for the canvas, wire rope isolators 130 would be tuned to a natural frequency less than or equal to 5 Hz (i.e., 7 Hz divided by 1.4). However, configuring a wire thickness 137, number of loops 132, loop diameter 136, loop spacing 135, number of wires in a rope braid, number of wire rope isolators 130, angle of orientation of wire rope isolators 130 relative to platform 110, and/or position of wire rope isolators 130 relative to the platform 110 to achieve a natural frequency of 5 Hz may be impractical. For example, tuning wire rope isolators 130 to a frequency as low as 5 Hz may require a relatively large wire thickness 137 that can be difficult to form into a small loop and may thus have a large loop diameter 136. Wire rope isolators 130 with a wire thickness 137 and loop diameter 136 large enough to isolate low frequencies may take up too much space within case 205. To address this problem, the panel system described with respect to FIGS. 7-8 can be used to increase the natural frequency of the canvas, which in turn increases the natural frequency to which wire rope isolators 130 would be tuned.

Continuing with the example, back panel 310 can be configured to double the natural frequency of the canvas (from 7 Hz to 14 Hz in the example). To achieve a tuning ratio greater than 1.4 for the canvas-and-back panel 310 configuration, wire rope isolators 130 would be tuned to a natural frequency less than or equal to 10 Hz (i.e., 14 Hz divided by 1.4). The natural frequency of the canvas can be further increased with the addition of front panel 301. Front panel 301 can be configured to increase the natural frequency of the canvas-and-back panel 301 configuration by about one-third (from 14 Hz to 21 Hz in the example). To achieve a tuning ratio greater than 1.4 for the canvas-and-back panel 310-and-front panel 301 configuration, wire rope isolators 130 would be tuned to a natural frequency less than or equal to 15 Hz (i.e., 21 Hz divided by 1.4). The natural frequency of the canvas can be further increased with the addition of stiffener panel 302. Stiffener panel 302 can be configured to double the natural frequency of the canvas-and-back panel 301-and-front panel 302 configuration (from 21 Hz to 42 Hz in the example). To achieve a tuning ratio greater than 1.4 for the configuration that includes the canvas, back panel 310, front panel 301, and stiffener panel 302, wire rope isolators 130 would be tuned to a natural frequency less than or equal to 30 Hz (i.e., 42 Hz divided by 1.4). In certain embodiments, the panel system may be tuned to achieve a natural frequency in the range of approximately 40-70 Hz for object 300, and wire rope isolators may be tuned to a natural frequency less than or equal to 50 Hz (i.e., 70 Hz divided by 1.4), such as a natural frequency less than or equal to approximately 28.6 Hz (i.e., 40 Hz divided by 1.4).

Certain embodiments of the present disclosure may provide one or more technical advantages. Certain embodiments may protect an object from damage due to vibrations, displacement, impact, temperature, and/or humidity. As discussed above, any suitable combination of the components described herein can be used to provide the desired protections.

Vibration protection can be provided by a combination of vibration-damping footing 210, suspension system 100 comprising isolators 130, and/or the panel system. In certain embodiments, vibration-damping footing 210 can be tuned to protect a canvas from frequencies in the range of approximately 0-10 Hz, a panel system can be tuned to increase the natural frequency of the canvas to at least 40 Hz, and isolators 130 can be tuned to yield a tuning ratio greater than or equal to 1.4.

Excursion protection can be provided by the panel system and/or vibration-damping footing 210. The panel system can impart stiffness to the canvas that protects against excursions. In certain embodiments, the panel system limits excursions at the most flexible point (the middle of the canvas) to a value that does not affect the adhesion or cohesion of the paint to the canvas. For example, panel system can be configured to limit excursions greater than 350 microns. In certain embodiments, the stiffness imparted by the panel system can prevent sagging of the canvas in the event that the panel system is tilted and can reduce the likelihood of the canvas coming into contact with its glazing, for example, in the event that a person inadvertently presses on the stiffener panel. In certain embodiments, some excursion protection can also be provided by vibration-damping footing tuned to dampen low frequency (e.g., 5 Hz) vibrations from the transport vehicle that would otherwise impinge high energy on the canvas and result in excursions.

Impact protection can be provided by suspension system 100 (e.g., wire rope isolators 130), shock absorbing structures of crumple zone 142, and/or case 205 (e.g., a case comprising plastic, polycarbonate honeycomb, polypropylene honeycomb, or other material that deforms on impact and absorbs some of the energy of the impact). In certain embodiments, impact protection components are configured to limit the total G force in an impact resulting from a drop of up to one meter. For example, impact protection components can be configured to reduce the total impact shock to below 20G. As discussed with respect to FIGS. 4A-4B above, a foam structure, such as a mass of smartfoam, can be positioned within a wire rope isolator 130 to act as a safety stop that prevents wire rope isolator 130 from crimping or creasing in the event of an impact.

Temperature protection can be provided by macroclimate controls within case 205 and/or microclimate controls within back panel 310 of the panel system. As an example, the macroclimate control may use thermal phase change materials (e.g., tiles encased within platform 110 and/or tiles that snap in and out of case 205) to maintain an internal temperature within case 205. For example, the temperature may be maintained at 22° C., plus or minus 4° C., given an exterior fluctuation of 22° C., plus or minus 10° C. In other words, for exterior temperatures in the range of 12° C. to 32° C., the temperature within case 205 may be maintained in the range of 18° C. to 26° C.

Humidity protection can be provided by macroclimate controls within case 205 and/or microclimate controls within back panel 310 of the panel system. As an example, the macroclimate control may use silica gel felt within case 205 to maintain humidity within the range of 40% to 60% humidity given an internal temperature in the range of 18° C. to 26° C.

As a more specific example of combining the various components disclosed herein, an embodiment for transporting a stretched canvas or similar object comprises a case 205 (such a hard shell case similar to those manufactured by PELICAN™ or STORM CASE™) configured with thermal phase change material, humidity control material, wire rope isolators 130, a crumple zone 142, and a panel system comprising front panel 301, stiffener panel 302, and back panel 310, wherein the back panel 310 is configured to provide microclimate control. The thermal phase change material provides lightweight insulation that absorbs and releases thermal energy in order to avoid significant temperature fluctuations within case 205. In certain embodiments, the thermal phase change material is implemented using tiles (e.g., tiles encased within platform 110 and/or tiles that snap in and out of case 205). The humidity control material can be implemented using silica gel tiles that can attach inside the doors of case 205. Wire rope isolators 130, such as those discussed with respect to FIGS. 1-4, isolate platform 110 and load 120 from damaging vibration frequencies. For example, wire rope isolators can be tuned to yield a tuning ratio greater than or equal to 1.4, the tuning ratio determined by dividing a natural frequency of an object that the vibration-isolating system protects by a natural frequency of the vibration-isolating system. Crumple zone 142 comprises shock absorbing structures, such as XPS core, polypropylene honeycomb structures, or other shock absorbing structures described with respect to FIG. 3 above, to absorb the impact from shock in the event case 205 is dropped. The panel system stabilizes the canvas against high displacement excursions, such as excursions greater than 350 microns. For example, as discussed with respect to FIGS. 7-8, a stiffener panel 302 in combination with front panel 301 and back panel 310 provides rigidity to load 120. The back panel 310 is further configured to provide microclimate control. For example, back panel 310 comprises back board 314 (e.g., insulating foam core board that can include a vapor barrier, such as an aluminized polyethylene film) and/or humidity control layer 313 (e.g., silica gel felt).

Certain embodiments may have all, some, or none of the above-identified advantages. Other advantages will be apparent to persons of ordinary skill in the art.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A container assembly for protecting a flexible panel, the container assembly comprising:
   a back panel positioned behind the flexible panel and offset by a first substantially airtight compartment, wherein the back panel comprises a back board, a decontamination layer, and a humidity control layer, the decontamination layer and the humidity control layer positioned between the flexible panel and the back board;
   a front panel comprising an acrylic material, the front panel positioned in front of the flexible panel and offset by a first gasket resulting in a second substantially airtight compartment, the second substantially airtight compartment having a depth in the range of 3-10 millimeters;
   a stiffener panel positioned in front of the front panel, the stiffener panel offset by a second gasket resulting in a third substantially airtight compartment, the third substantially airtight compartment having a depth in the range of 3-5 millimeters; and
   a frame surrounding the periphery of the flexible panel, wherein a third gasket seals between the back panel and the frame, a fourth gasket seals between the flexible panel and the frame, and a fifth gasket seals between the front panel and the frame;
   wherein:
      the front panel, the back panel, and the stiffener panel each comprise one or more rigid materials, each rigid material having higher natural frequency and lower excursion properties than the flexible panel; and
      the container assembly is tuned using fixed, gas-piston principles to impart the higher natural frequency and lower excursion properties of the rigid materials to the flexible panel such that the natural frequency of the flexible panel increases and the extent to which the flexible panel experiences excursions greater than 350 microns is reduced.

2. A container assembly for protecting a substantially flat object, the container assembly comprising:
   a back panel positioned behind the object and offset by a first sealed air compartment; and
   a front panel positioned in front of the object and offset by a second sealed air compartment;
   wherein the object comprises a stretched canvas within a frame and the container assembly further comprises a first gasket between the back panel and the frame, a second gasket between the object and the front panel, and a third gasket between the front panel and the frame.

3. The container assembly of claim 2, wherein the offset of the second sealed air compartment is dimensioned so as to tune the natural frequency of the object against vibrations.

4. The container assembly of claim 3, wherein the offset of the second sealed air compartment is dimensioned so that the object and the front panel are in close proximity.

5. The container assembly of claim 2, wherein each of the first and second sealed air compartments are substantially airtight.

6. A container assembly for protecting an object, the container assembly comprising:
   a back panel positioned behind the object and offset by a first sealed air compartment;
   a front panel positioned in front of the object and offset by a second sealed air compartment; and
   a stiffener panel positioned in front of the front panel and offset by a third sealed air compartment;
   wherein the front panel, the back panel, and the stiffener panel each comprise one or more rigid materials, each rigid material having higher natural frequency and lower excursion properties than the object; and
   the container assembly is tuned using fixed, gas-piston principles to impart the higher natural frequency and lower excursion properties of the rigid materials to the object such that the natural frequency of the object increases and the extent to which the object experiences excursions greater than 350 microns is reduced.

7. The container assembly of claim 6, wherein:
   the offset between the object and the front panel is within the range of approximately 3-10 millimeters; and
   the offset between the front panel and the stiffener panel is within the range of approximately 3-5 millimeters.

8. The container assembly of claim 6, wherein the front panel comprises an acrylic material.

9. The container assembly of claim 6, wherein the stiffener panel comprises a paper honeycomb sheet.

10. The container assembly of claim 6, wherein the back panel comprises a foam core board.

11. The container assembly of claim 10, wherein the back panel further comprises a decontamination layer and a humidity control layer positioned between the foam core board and the object.

12. The container assembly of claim 6, further comprising:
   a first gasket positioned between the object and the front panel; and a second gasket positioned between the front panel and the stiffener panel.

13. The container assembly of claim 6, further comprising a gasket positioned between the front panel and the stiffener panel, the gasket having a non-rectangular geometry.

14. The container assembly of claim 6, wherein:
the object has a natural frequency in the range of 1 Hz to 20 Hz;
the first sealed air compartment is dimensioned so as to increase the natural frequency of the object by at least 20%;
the second sealed air compartment is dimensioned so as to increase the natural frequency of the object by at least 20%; and
the third sealed air compartment is dimensioned so as to increase the natural frequency of the object by at least 20%.

15. The container assembly of claim 14, wherein the combination of the first, second, and third sealed air compartments increase the natural frequency of the object to at least 40 Hertz.

16. The container assembly of claim 6, wherein each of the first, second, and third sealed air compartments is substantially airtight.

17. The container assembly of claim 6, wherein the object comprises a stretched canvas.

18. A container assembly for protecting an object, the container assembly comprising:
a back panel positioned behind the object and offset by a first sealed air compartment;
a front panel positioned in front of the object and offset by a second sealed air compartment; and
a stiffener panel positioned in front of the front panel and offset by a third sealed air compartment, the stiffener panel having a non-uniform thickness such that a volume of a corner portion of the third sealed air compartment is reduced as compared to the volume of a middle portion of the third sealed air compartment.

* * * * *